(12) United States Patent
Pfitzer et al.

(10) Patent No.: US 8,716,885 B2
(45) Date of Patent: May 6, 2014

(54) DISCONNECT SWITCH FOR DISTRIBUTED ENERGY SYSTEM

(75) Inventors: Hans-Erik Pfitzer, Chesterfield, VA (US); Adil Oudrhiri, Richmond, VA (US)

(73) Assignee: Thomas & Betts International, Inc., Wilmington, DE (US)

( * ) Notice: Subject to any disclaimer, the term of this patent is extended or adjusted under 35 U.S.C. 154(b) by 272 days.

(21) Appl. No.: 13/276,406

(22) Filed: Oct. 19, 2011

(65) Prior Publication Data

US 2013/0099566 A1 Apr. 25, 2013

(51) Int. Cl.
*H02J 1/10* (2006.01)

(52) U.S. Cl.
USPC ........... 307/29; 307/11; 307/85; 307/64; 307/116; 702/58; 702/59; 702/64; 361/91.8; 361/18; 361/20; 361/21; 361/55; 323/350

(58) Field of Classification Search
USPC ........... 307/29, 11, 24, 85, 64, 116; 361/91.8, 361/18, 55, 52, 53, 100; 363/54, 85, 128; 702/58, 59, 64
See application file for complete search history.

(56) References Cited

U.S. PATENT DOCUMENTS

| | | | |
|---|---|---|---|
| 5,229,651 A | 7/1993 | Baxter, Jr. et al. | |
| 5,555,182 A | 9/1996 | Galm | |
| 6,219,623 B1 | 4/2001 | Wills | |
| 6,567,253 B1 * | 5/2003 | Herwig et al. | 361/91.8 |
| 6,810,339 B2 | 10/2004 | Wills | |
| 6,850,074 B2 | 2/2005 | Adams et al. | |
| 6,914,763 B2 | 7/2005 | Reedy | |
| 6,963,802 B2 | 11/2005 | Enis et al. | |
| 7,138,728 B2 | 11/2006 | LeRow et al. | |
| 7,146,256 B2 | 12/2006 | Hibi et al. | |
| 7,262,520 B2 | 8/2007 | Nguyen et al. | |
| 7,332,827 B2 | 2/2008 | Nielsen | |
| 7,376,491 B2 | 5/2008 | Walling et al. | |
| 7,408,268 B1 | 8/2008 | Nocentini et al. | |
| 7,447,568 B2 | 11/2008 | Christensen et al. | |
| 7,462,946 B2 | 12/2008 | Wobben | |
| 7,521,825 B2 | 4/2009 | Lasseter et al. | |
| 7,545,053 B2 | 6/2009 | Yoshikawa et al. | |
| 7,612,466 B2 | 11/2009 | Skutt | |
| 7,729,811 B1 | 6/2010 | Weir et al. | |
| 7,800,248 B2 | 9/2010 | Krämer et al. | |
| 7,834,479 B2 | 11/2010 | Capp et al. | |
| 7,851,934 B2 | 12/2010 | Nyborg | |
| 7,859,125 B2 | 12/2010 | Nielsen et al. | |
| 7,911,072 B2 | 3/2011 | Nyborg | |
| 7,915,760 B2 | 3/2011 | Evans, Sr. | |

(Continued)

FOREIGN PATENT DOCUMENTS

EP 1 965 483 A1 9/2008

*Primary Examiner* — Jared Fureman
*Assistant Examiner* — Jagdeep Dhillon
(74) *Attorney, Agent, or Firm* — Snyder, Clark, Lesch & Chung, LLP

(57) ABSTRACT

A switching assembly includes a first terminal and a second terminal, a first switch connected to the first terminal, and a second switch connected to the second terminal. The switching assembly further includes a rectifier bridge connected between the first switch and the second switch, and a third switch connected between the first terminal and the second terminal. The switching assembly also includes a control unit that selectively opens and closes the first switch, the second switch and the third switch, and selectively turns on and off the rectifier bridge.

20 Claims, 17 Drawing Sheets

NORMAL MODE

(56) References Cited

U.S. PATENT DOCUMENTS

| | | |
|---|---|---|
| 7,920,942 B2 | 4/2011 | Lasseter et al. |
| 7,925,552 B2 | 4/2011 | Tarbell et al. |
| 7,933,689 B2 | 4/2011 | Warren et al. |
| 8,060,321 B2 * | 11/2011 | Heber et al. .................. 702/58 |
| 8,232,679 B2 * | 7/2012 | Bobb et al. ..................... 307/85 |
| 2006/0238929 A1 | 10/2006 | Nielsen |
| 2008/0150282 A1 | 6/2008 | Rebsdorf et al. |
| 2009/0079193 A1 | 3/2009 | Nielsen et al. |
| 2009/0174187 A1 | 7/2009 | Nyborg |
| 2011/0109297 A1 * | 5/2011 | Tosuntikool ................. 323/350 |
| 2013/0187451 A1 * | 7/2013 | Boe et al. ....................... 307/11 |

\* cited by examiner

MAINTENANCE MODE

DISCONNECT SWITCH FOR DISTRIBUTED ENERGY SYSTEM

BACKGROUND

Currently, industrial countries generate most of their electricity in centralized utility power facilities, such as fossil fuel, nuclear, large solar power, or hydroelectric power plants. These centralized facilities usually transmit electricity over long distances to supply power to residences and businesses. Distributed energy generation is a recent innovation in which distributed energy resource (DER) systems are located very near where the energy is to be consumed, and typically entirely replace, or at least supplement, power supplied by the centralized utility power system. DER systems typically include small scale power generators that may supply power to one or more local residences and/or businesses. The close proximity of the DER systems to the energy consumer(s) reduces the amount of energy lost in transmitting electricity, and also reduces the size and number of power lines that must be constructed in the utility power system. DER systems may, in some instances, use renewable energy sources such as, for example, sunlight, wind and geothermal sources.

DETAILED DESCRIPTION OF THE PREFERRED EMBODIMENTS

Figure 1:
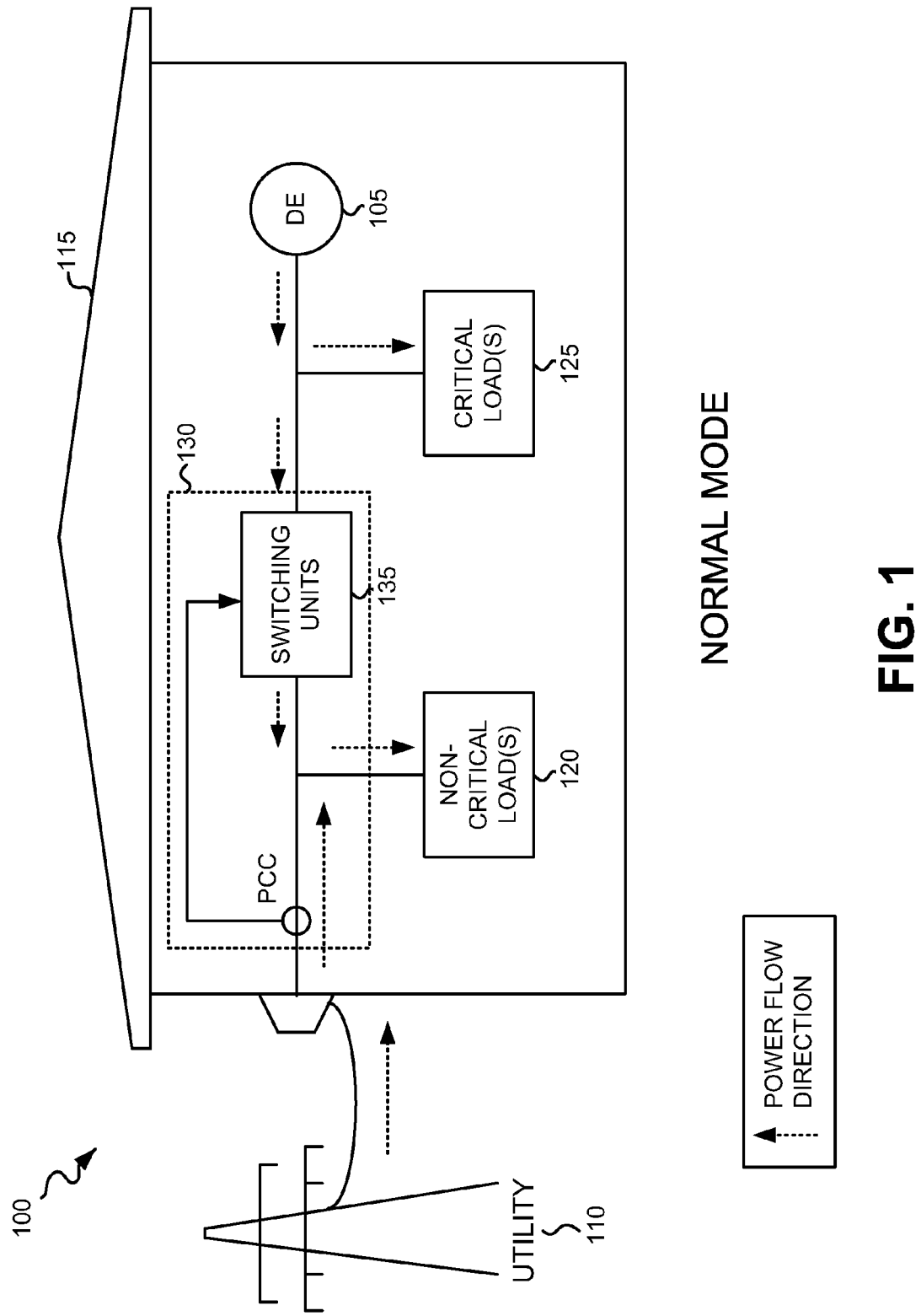
FIG. 1 is a diagram that illustrates an exemplary distributed energy system in which a distributed energy source, in conjunction with a utility power source, may be used to power loads at a business or residential location.

The following detailed description refers to the accompanying drawings. The same reference numbers in different drawings may identify the same or similar elements. The following detailed description does not limit the invention.

The emerging use of alternative energy has led to the burgeoning of distributed energy sources to support local loads and growing energy demands. The nature of alternative energy sources, such as wind and solar power, creates varying availability. Distributed energy systems also generate excess power when load requirements are not at peak levels, preventing full use of the energy generated since utility grids are not designed to accommodate generation and storage at the local distribution level. Additionally, powering loads when the distributed energy system requires maintenance necessitates the transfer to another energy source.

The integration of the local grid for distributed energy with the electrical power utility grid would enable the utility grid to supplement the distributed energy sources during periods of peak demand. Integration would also enable the utility grid to absorb excess capacity from the distributed energy source, where local regulations would allow it, when the demand is at less than peak levels. There have been few national standards for interconnection and testing for operation and certification, and fewer uniform building, electrical and safety codes, which has complicated the transition to the use and integration of distributed energy sources. The Institute of Electrical and Electronic Engineers' Standard for Interconnecting Distributed Resources with Electrical Power Systems, IEEE 1547, is one of the few nationally recognized standards that govern the integration of distributed energy systems with electrical power utility grids. The integration of the local grid with the utility grid provides the local grid with greater support and the utility grid with a source of additional energy, but can subject the local grid to failure when the utility grid fails, even when compliant with IEEE 1547.

The disconnect switch for distributed energy systems, described herein, meets the demand for a means of integrating local grids with utility grids that avoids subjecting local grids to failures in the utility grids. The disconnect switch enables the quick connection and disconnection of the distributed energy source and critical loads to and from the utility grid, and anticipates power source failure and makes necessary connections and disconnections without interruption of power through the use of silicon-controlled rectifiers. The disconnect switch monitors voltage, current, frequency and phase synchronization, and detects fault currents from both local and utility grids, and automatically switches from distributed energy to utility grid sources within 20 milliseconds in response to indications of imminent power failure. The disconnect switch also monitors and corrects power reversals and back feeding, and automatically transfers excess energy generated by the distributed energy source to the utility grid or other, non-critical loads.

During normal operation, the disconnect switch transmits excess electricity from the distributed energy source to power non-critical loads or to be exported to the utility grid, when the distributed energy source powers critical loads. During instances when the utility grid is not operating, the disconnect switch operates in an island mode, isolating the distributed energy source and critical loads from the utility grid and non-critical loads. When the distributed energy source is disabled (e.g., for maintenance), the switch transmits energy from the utility grid to power critical, as well as, non-critical loads.

FIG. 1 illustrates an exemplary distributed energy system 100 in which a distributed energy source, in conjunction with utility power, may be used to power loads at a business or residential location 115 (hereinafter referred to as "location 115"). As shown in FIG. 1, a utility power source 110 may supply power to location 115 to power one or more non-critical loads 120. As further shown in FIG. 1, location 115 may include a distributed energy (DE) source 105 that may supply power to one or more critical loads 125. A switching assembly 130 may include multiple switching units 135 (i.e., one switching unit per phase) for selectively switching, as described in further detail below, the flow of power from utility power source 110 and/or DE source 105, to non-critical load(s) 120 and critical load(s) 125.

Figure 2:
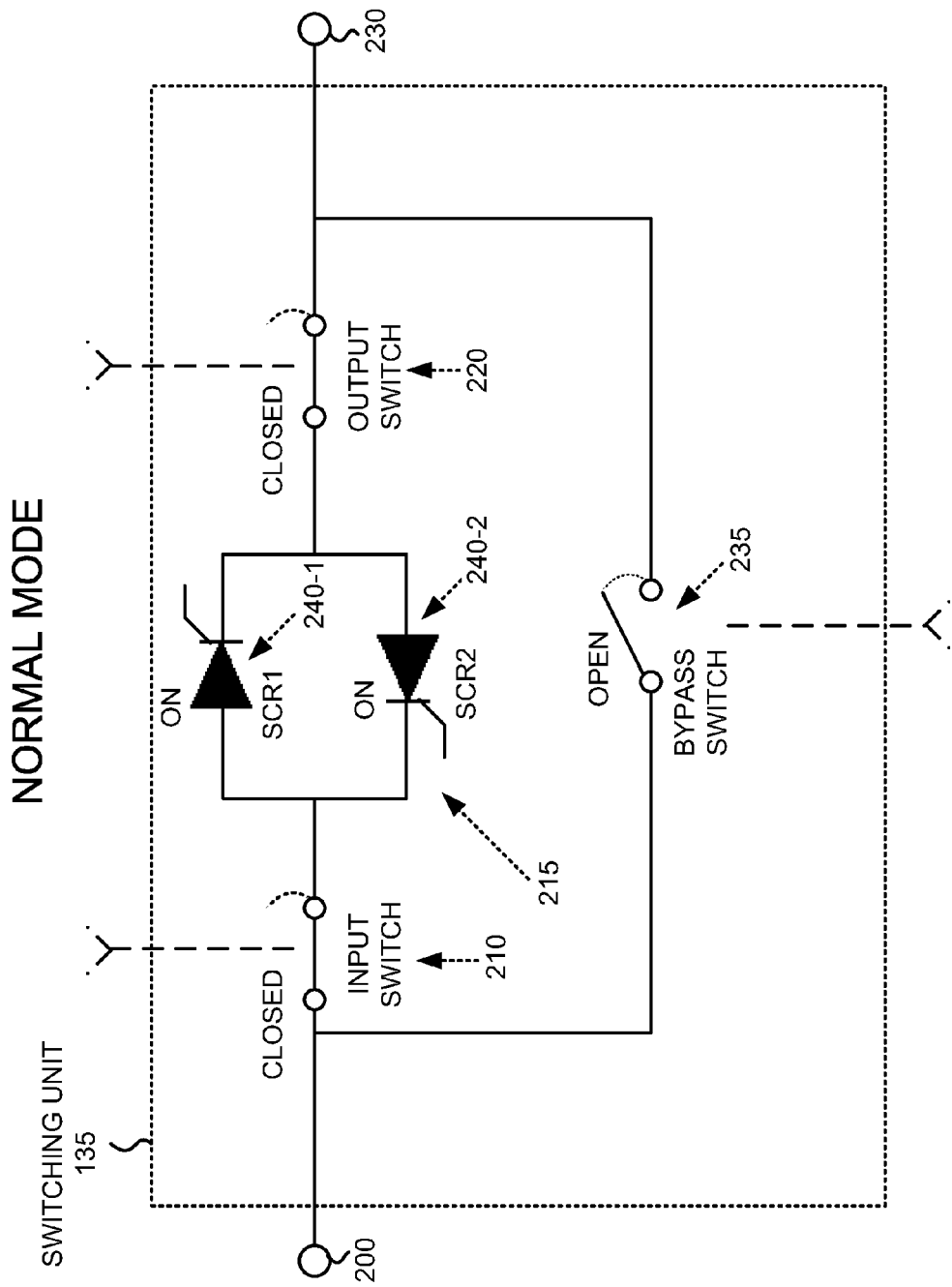
FIG. 2 is a diagram that depicts a switching unit operating during the normal operating mode shown in FIG. 1.

FIG. 1 depicts a "normal mode" in which utility power source 110 may supply power to non-critical load(s) 120 of location 115, and DE source 105 may supply power to critical load(s) 125, and may export excess power to utility power source 110 via switching assembly 130. Each switching unit 135 of switching assembly 130 may include switching circuitry (not shown) connected to a single phase of power being delivered by utility power source 110 and/or DE power source 105. FIG. 2 depicts a single switching unit 135 operating during the "normal mode" shown in FIG. 1. Switching assembly 130 of FIG. 1 may include a switch unit 135 for each phase. As can be seen in FIG. 2, an input terminal 200 of switching unit 135 connects to an input switch 210 which further connects to silicon controlled rectifier (SCR) bridge 215. SCR bridge 215 further connects to output switch 220 which, in turn, connects to output terminal 230. Therefore, input switch 210, SCR bridge 215 and output switch 220 connect in series between input terminal 200 and output terminal 230. As further shown in FIG. 2, a bypass switch 235 may connect between input terminal 200 and output terminal 230 in parallel across the series connected input switch 210, SCR bridge 215 and output switch 220. SCR bridge 215 may include a first SCR 240-1 and a second SCR 240-2 connected in parallel to one another. SCR 240-1 may have its anode connected to input switch 210 and its cathode connected to output switch 220. SCR 240-2 may have its cathode connected to input switch 210 and its anode connected to output switch 220. The gates of SCRs 240-1 and 240-2 may additionally connect to a control unit (connection not shown in FIG. 2) such that the control unit may apply control voltages to turn on or turn off SCRs 240-1 and 240-2. In other implementations, other types of fast acting semiconductor devices may be used in place of SCR bridge 215. For example, an insulated-gate bipolar transistor(s) (IGBT(s)) may be used instead of SCR bridge 215. Input switch 210, output switch 220, and bypass switch 235 may each, in some implementations, include a single pole, single throw switch. In other implementations, input switch 210, output switch 220 and bypass switch 235 may each include a contactor or a motorized breaker. In still other implementations, switches 210, 220, and/or 235 may use triple pole, single throw switches for three phases. Additional implementations may use 1, 2, 3 or 4 pole switches.

As shown in FIG. 1, in the "normal mode," when utility power source 110 is delivering power to non-critical load(s) 120 and DE power source 105 is delivering power to critical load(s) 125 and through switching units 135 to non-critical load(s) 120 and utility power source 110, input switch 210 (as shown in FIG. 2) may be in a closed position, output switch 220 may be in a closed position, bypass switch 235 may be in an open position, and SCRs 240-1 and 240-2 may be turned on. With input switch 210 in a closed position, output switch 220 in a closed position, bypass switch 235 in an open position, and SCRs 240-1 and 240-2 turned on, power may flow from DE power source 105 into output terminal 230, through switching unit 135, and out input terminal 200 to non-critical load(s) 120 and utility power source 110.

Figure 3:
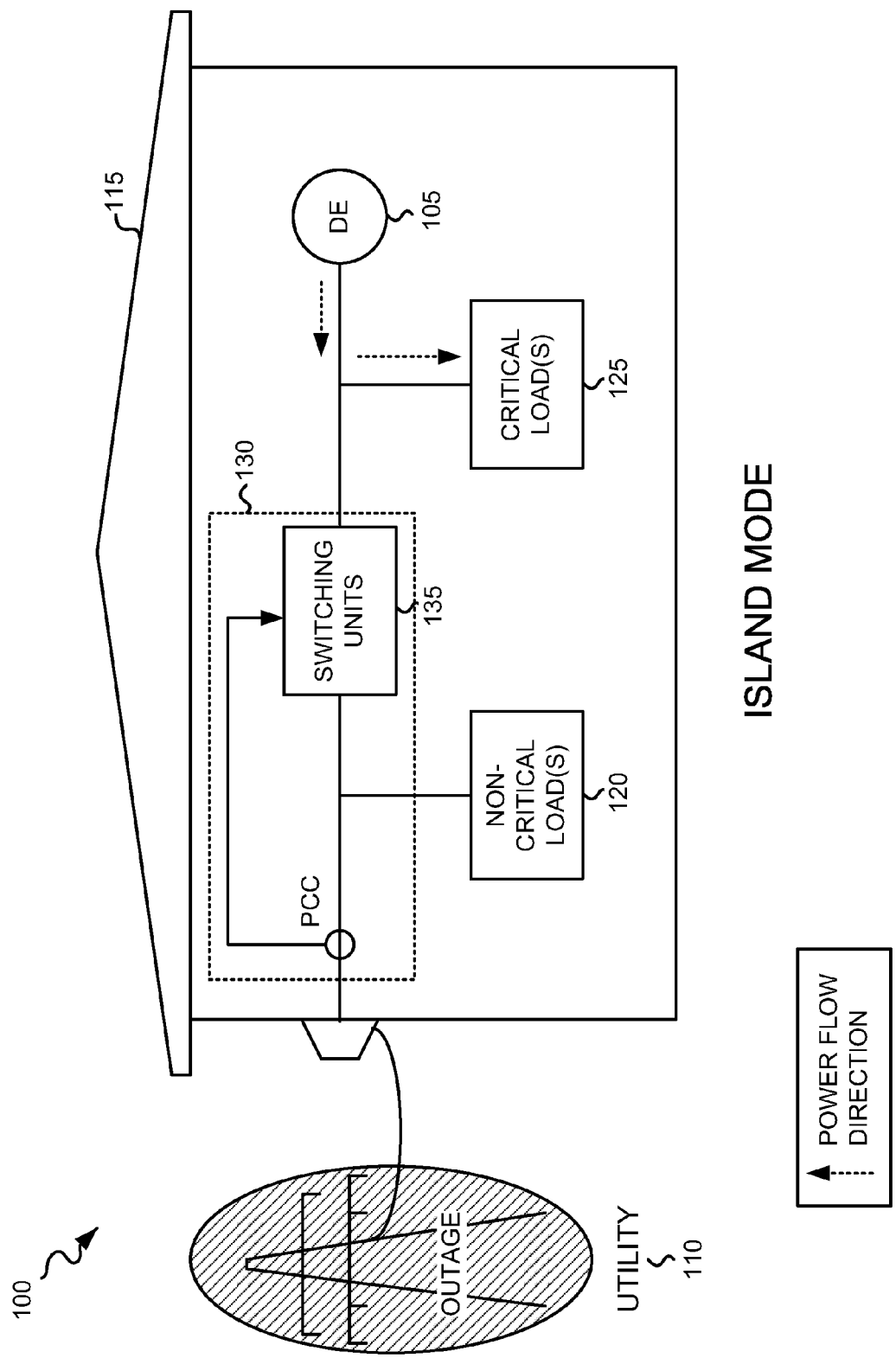
FIG. 3 is a diagram that depicts an "island" operating mode where the utility power source fails to supply power to the business or residential location, and switching units cause the distributed energy power source to continues to supply power to a critical load, but to discontinue exporting power to the utility power grid.
Figure 4:
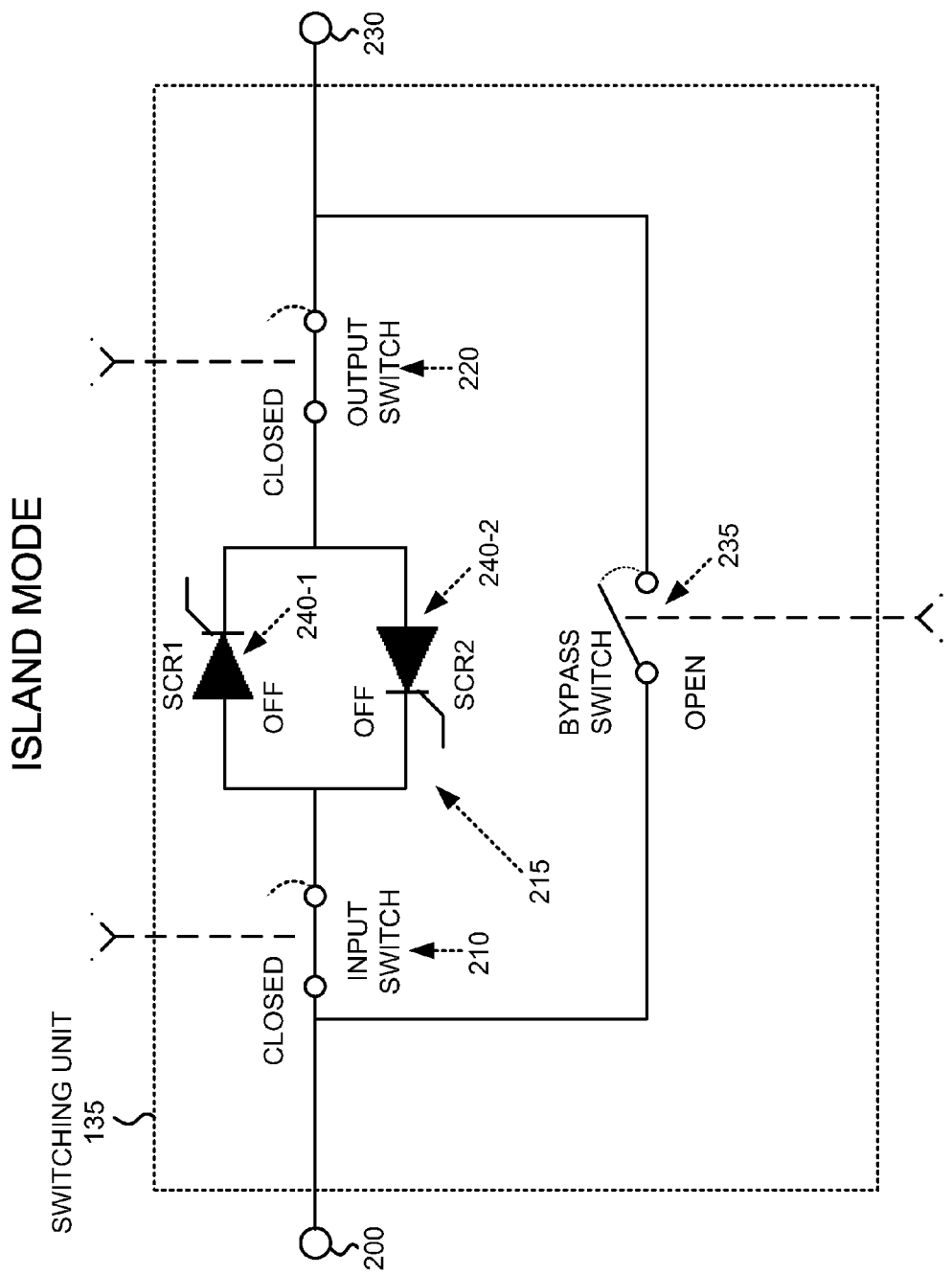
FIG. 4 is a diagram that depicts the switching unit of FIG. 2 operating during the island operating mode shown in FIG. 3.

FIG. 3 depicts an "island mode" in which utility power source 110 fails to supply power to location 115 (e.g., has an outage), and DE power source 105 continues to supply power to critical load(s) 125, but discontinues exporting power to utility power source 110 via switching assembly 130. FIG. 4 depicts switching unit 135 operating during the "island mode" shown in FIG. 3. As can be seen in FIG. 4, in the "island mode," when utility power source 110 is not delivering power to non-critical load(s) 120, but DE power source 105 continues to deliver power to critical load(s) 125, input switch 210 may be in a closed position, output switch 220 may be in a closed position, bypass switch 235 may be in an open position, and SCRs 240-1 and 240-2 may be turned off. With input switch 210 in a closed position, output switch 220 in a closed position, bypass switch 235 in an open position, and SCRs 240-1 and 240-2 turned off, power may not flow from DE power source 105 through switch unit 135 and, therefore, DE power source 105 may be isolated from non-critical load(s) 120 and utility power source 110, and utility power source 110 may be isolated from critical load(s) 125.

Figure 5:
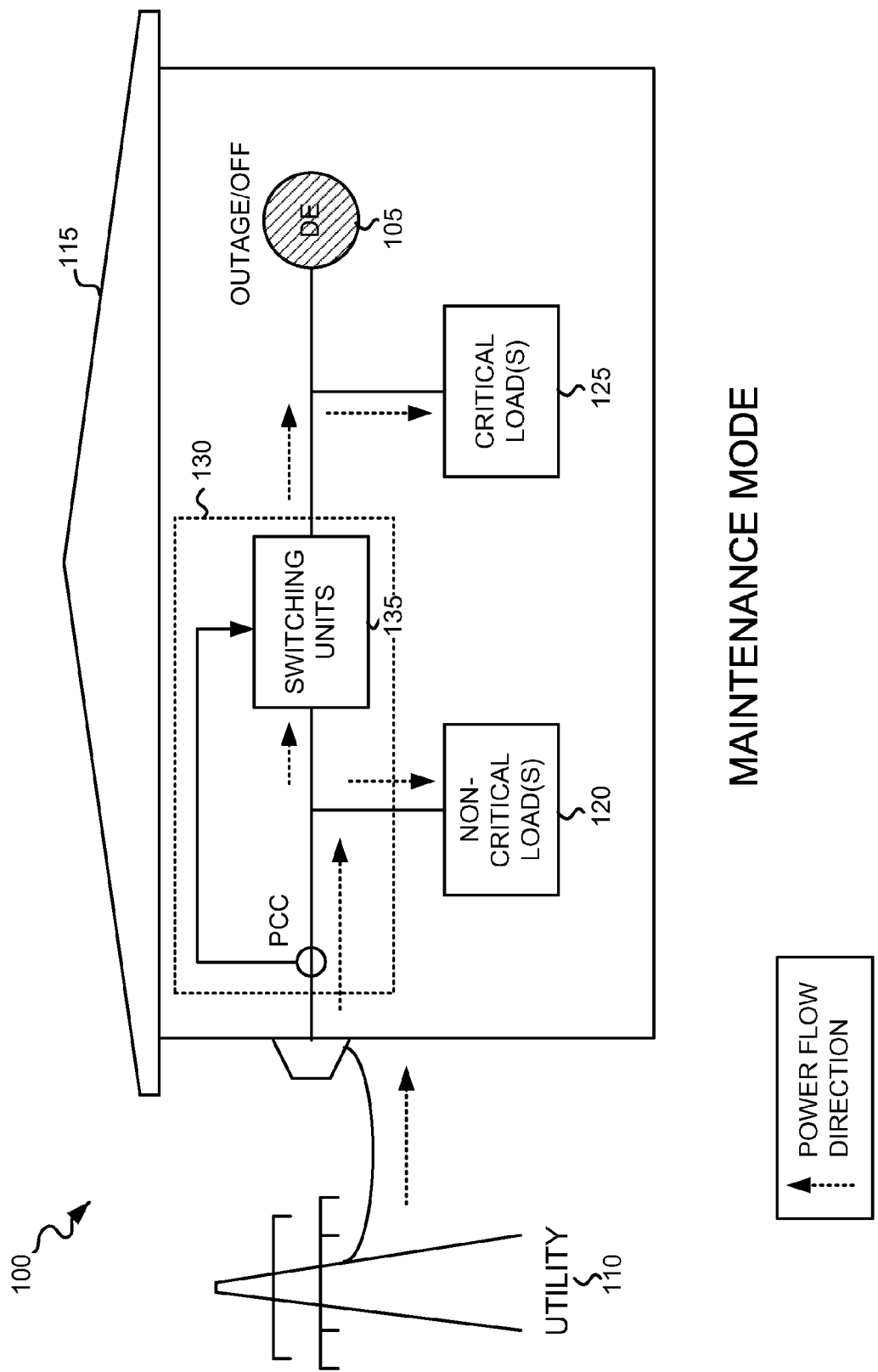
FIG. 5 is a diagram that depicts a "maintenance" operating mode where the distributed energy power source has either had an outage or has been turned off, and the switching units switch to cause the utility power source to deliver power to the critical load(s) of the business or residential location.
Figure 6:
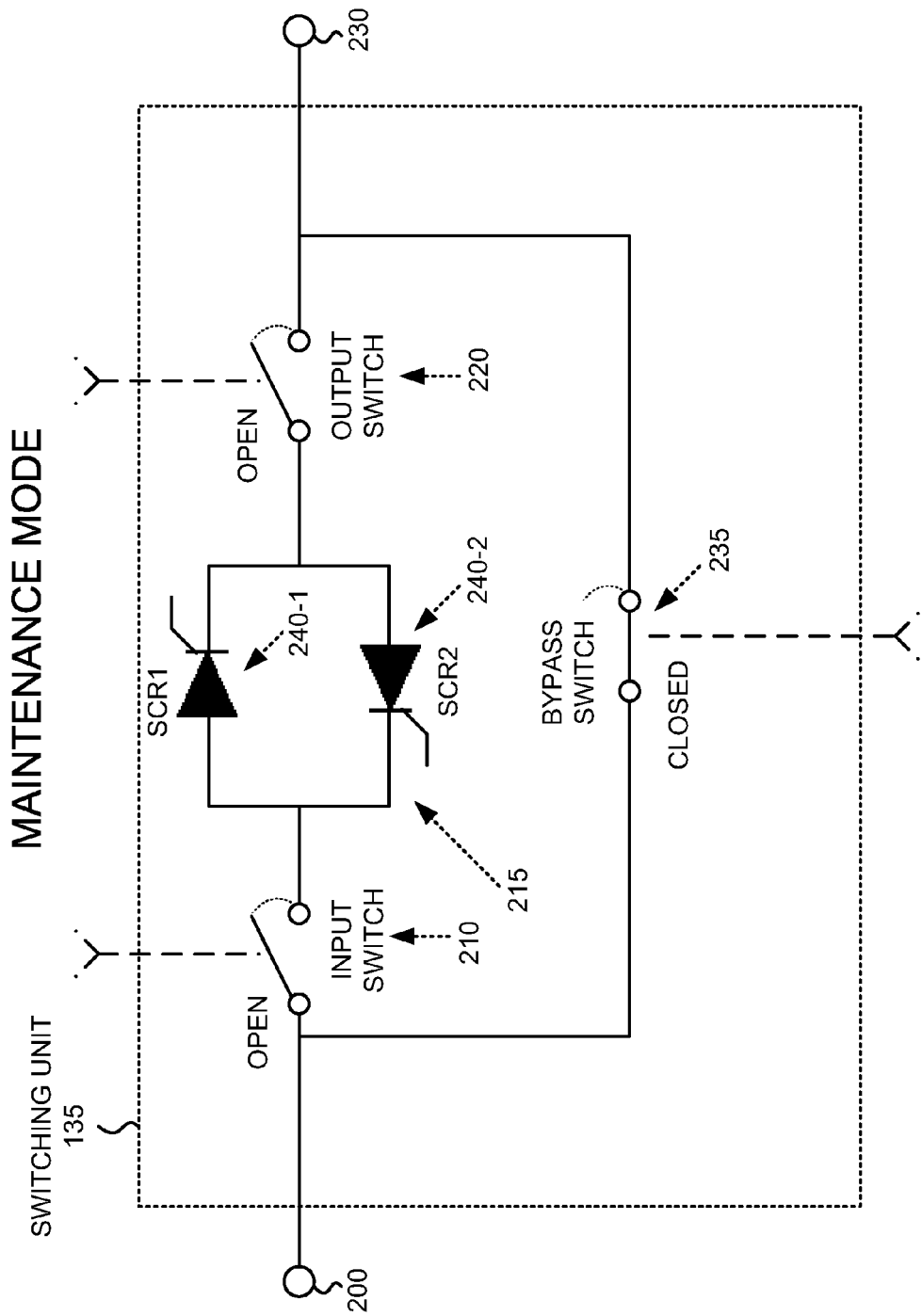
FIG. 6 is a diagram that depicts a switching unit operating during the "maintenance" operating mode shown in FIG. 5, during which utility power source supplies power to the non-critical load(s) and to the critical load(s) 125 due to the distributed energy power source having an outage or being turned off.

FIG. 5 depicts a "maintenance mode" in which utility power source 110 delivers power to location 115, but DE power source 105 has either had an outage or has been turned off, and is no longer delivering power to critical load(s) 125 and no longer exports power to utility power source 110. FIG. 6 depicts switching unit 135 operating during the "maintenance mode" shown in FIG. 5, during which utility power source 110 supplies power to non-critical load(s) 120 and critical load(s) 125 due to DE power source 105 having an outage or being turned off. As can be seen in FIG. 6, in the "maintenance mode," when DE power source 105 discontinues supplying power to critical load(s) 125, but utility power source 110 continues to supply power, input switch 210 may be in an open position, output switch 220 may be in an open position, and bypass switch 235 may be in a closed position. With bypass switch 235 in a closed position, power may flow from utility power source 110 through switching unit 135, bypassing the series connected input switch 210, SCR bridge 215 and output switch 220, to critical load(s) 125.

Figure 7A:
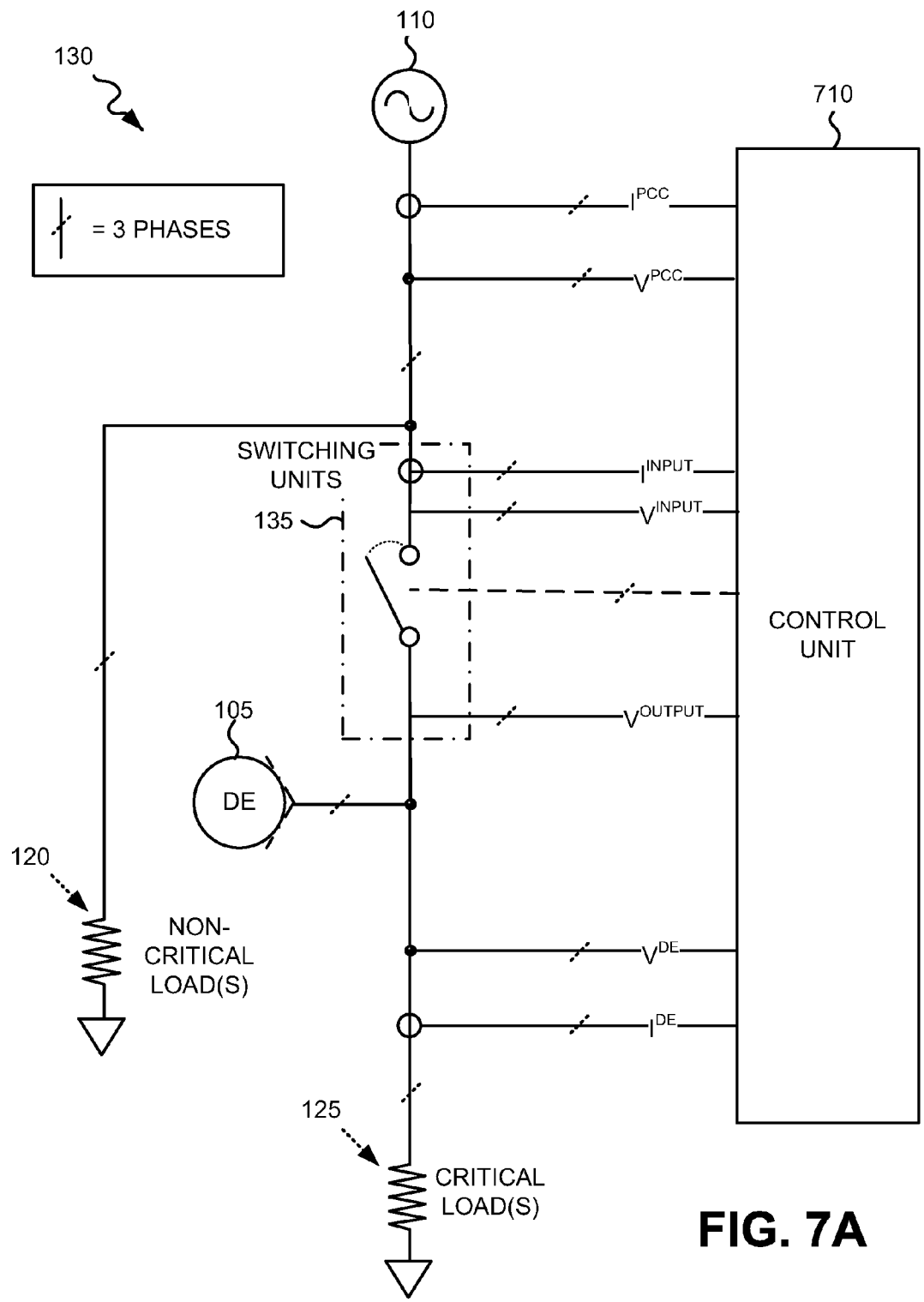
FIGS. 7A, 7B, 7C and 7C are diagrams that depict exemplary details of the switching assembly of FIG. 1 and its interconnection with the utility power source, the distributed energy power source, the non-critical load, and the critical load.

FIGS. 7A, 7B, 7C and 7D are diagrams that depict exemplary details of switching assembly 130 and its interconnection with utility power source 110, DE power source 105, non-critical load(s) 120 and critical load(s) 125. FIG. 7A shows a simplified view of switching assembly 130 that depicts interconnections which are aggregations of the three phases present in FIG. 7C. As shown in FIG. 7A, utility power source 110 connects to a first side (e.g., to a point of common coupling (PCC)) of switching units 135 and to non-critical load(s) 120). Control unit 710 of switching assembly 130 further includes current taps, on the first side of switching units 135, to measure currents $I^{PCC}$ supplied by utility power source 110 (and/or DE power source 105) to non-critical load(s) 120 and switching units 135, and connections, on the first side of switching units 135, to measure voltages ($V^{PCC}$) supplied by utility power supply 110 (or DE power source 105). Control unit 710 additionally includes connections, on a second side of switching units 135, to measure voltages ($V^{DE}$) supplied by DE power source 105 (or utility power source 110), and additional current taps, on the second side of switching units 135, to measure currents $I^{DE}$ supplied by DE power source 105 (and/or by utility power supply 110). Control unit 710 may selectively control the switching of switching units 135 to operate switching assembly 130 in the normal, island, or maintenance modes described above with respect to FIGS. 1-6.

Figure 7B:
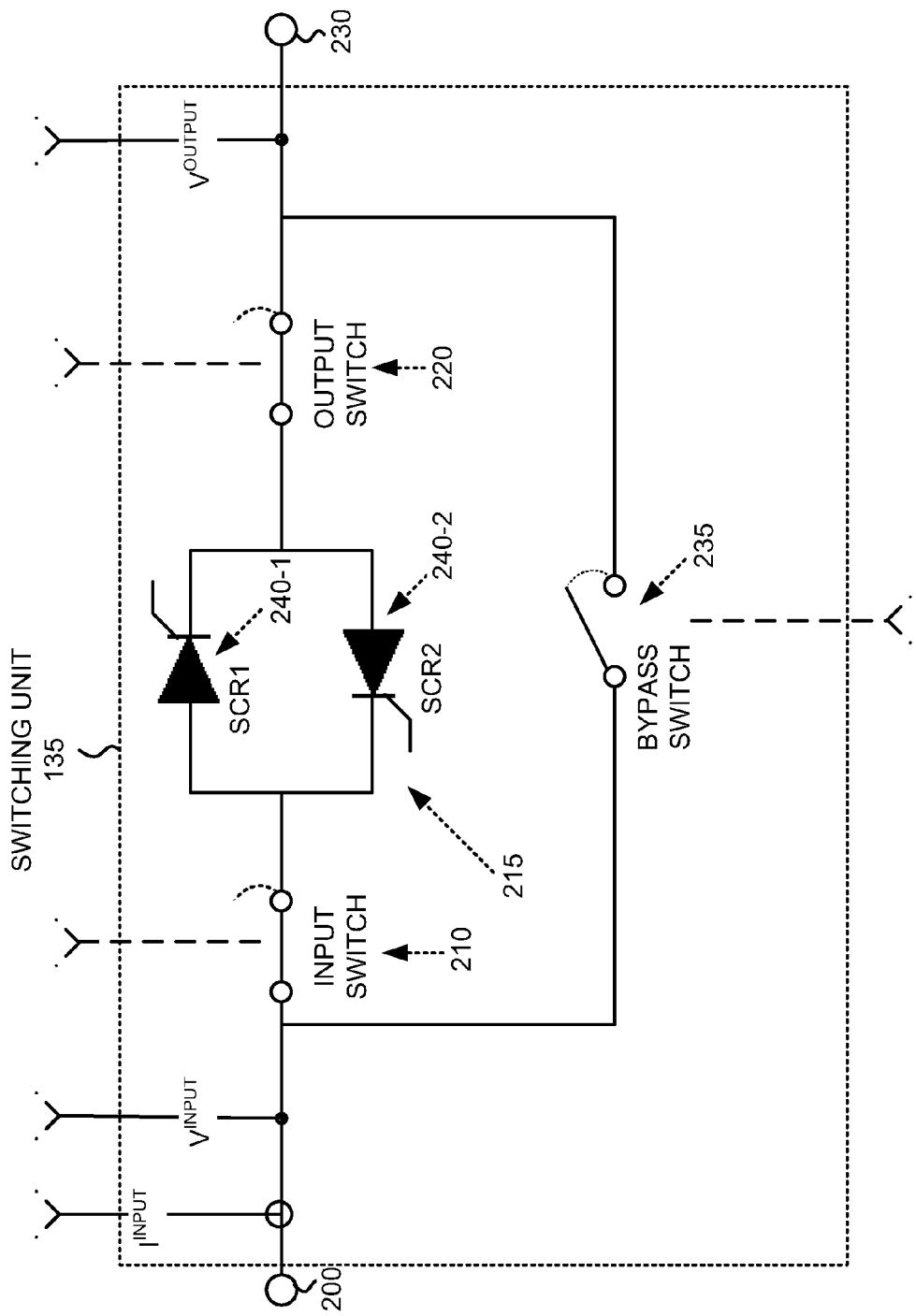

FIG. 7B depicts further details of switching unit 135, with current and voltage measuring connections at the input and output of switching unit 135. As shown in FIG. 7B, a current measuring tap $I^{INPUT}$ and a voltage measuring connection $V^{INPUT}$ may be connected between input terminal 200 and input switch 210. Current measuring tap $I^{INPUT}$ may measure current flowing through switching unit 135, and voltage measuring connection $V^{INPUT}$ may measure the voltage present at input terminal 200 of switching unit 135. As further shown in FIG. 7B, switching unit 135 may include a voltage measuring connection $V^{OUTPUT}$ connected between output switch 220 and output terminal 230. Voltage measuring connection $V^{OUTPUT}$ may measure the voltage present at output terminal 235 of switching unit 135. Current measuring tap $I^{INPUT}$ and voltage measuring connections $V^{INPUT}$ and $V^{OUTPUT}$ may connect to control unit 710 of switching unit such that control unit 710 may monitor the measured current and voltages present within switching unit 135.

Figure 7C:
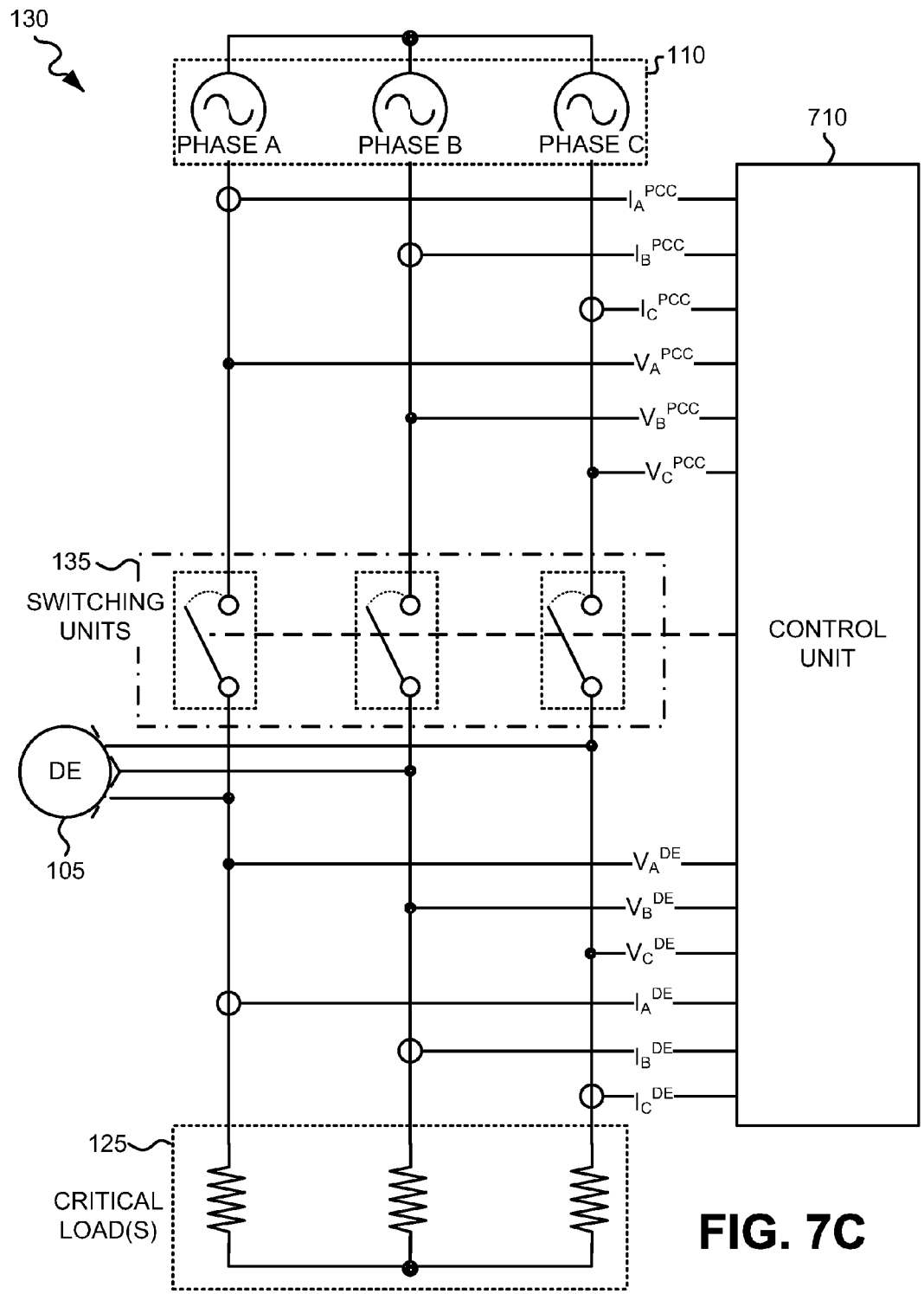

FIG. 7C depicts switching assembly of FIG. 7A, with further detail of the interconnections between control unit 710 and the three different phases of power. FIG. 7C, for the sake of simplicity, omits showing the interconnection of non-critical load(s) 120 on the first side of switching units 135, and further omits showing current measuring tap $I^{INPUT}$ and voltage measuring connections $V^{INPUT}$ and $V^{OUTPUT}$ of switching unit 135. As shown in FIG. 7C, control unit 710 includes a current tap on each phase (e.g., phase A, phase B, and phase C) on a first side of switching units 135 to measure a respective current $I_A^{PCC}$, $I_B^{PCC}$, and $I_C^{PCC}$. Currents $I_A^{PCC}$, $I_B^{PCC}$, and $I_C^{PCC}$ represent the three phases of current being supplied to switching assembly 130 and non-critical load(s) 120 by utility power source 110. Control unit 710 further has a connection to each phase on the first side of switching units 135 to measure a respective voltage $V_A^{PCC}$, $V_B^{PCC}$, and $V_C^{PCC}$. Voltages $V_A^{PCC}$, $V_B^{PCC}$, and $V_C^{PCC}$ represent the three phases of voltages being applied to switching assembly 130 and non-critical load(s) 120 by utility power source 110. As further shown in FIG. 7C, control unit 710 includes a current tap on each phase on a second side of switching units 135 to measure a respective current $I_A^{DE}$, $I_B^{DE}$ and $I_C^{DE}$. Currents $I_A^{DE}$, $I_B^{DE}$, and $I_C^{DE}$ represent the three phases of current being supplied to critical load(s) 125 by DE power source 105. Control unit 710 additionally has a connection to each phase on the second side of switching units 135 to measure a respective voltage $V_A^{DE}$, $V_B^{DE}$ and $V_C^{DE}$. Voltages $V_A^{DE}$, $V_B^{DE}$ and $V_C^{DE}$ represent the three phases of voltages being applied to non-critical load(s) 120 by DE power source 105, or by utility power source 110 via switching units 135.

Figure 7D:
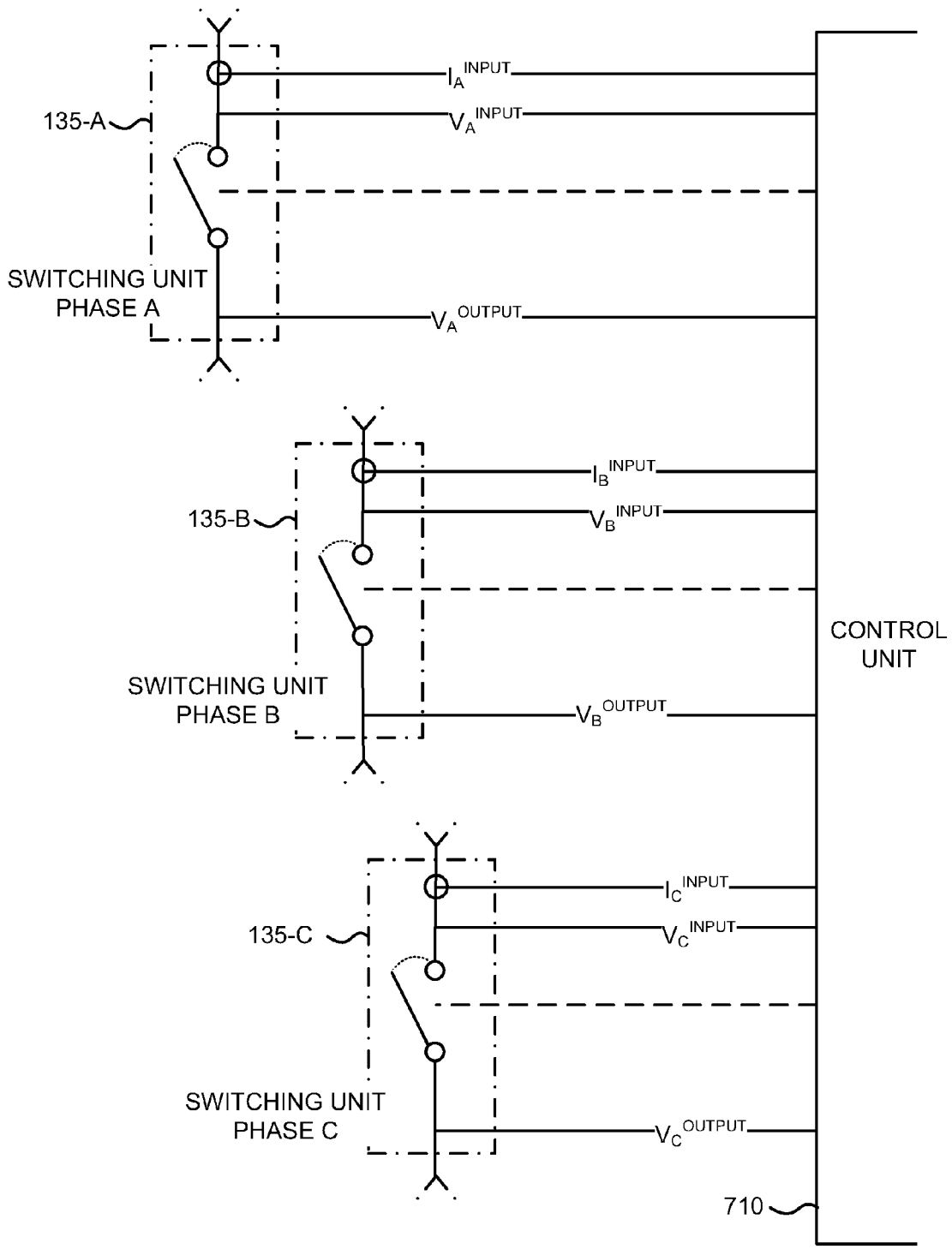

FIG. 7D depicts the interconnection of control unit 710 to switching units 135-A through 135-C associated with each phase A, B, and C of power sources 105 and 110. As shown in FIG. 7D, current measuring tap $I_A^{INPUT}$ and voltage measuring connection $V_A^{INPUT}$, is shown connected to the input side of switching unit 135-A for measuring the current and voltage of phase A at the input to switching unit 135-A. As further depicted in FIG. 7D, voltage measuring connection $V_A^{OUTPUT}$ is shown connected to the output side of switching unit 135-A for measuring the voltage of phase A at the output to switching unit 135-A.

As also shown in FIG. 7D, current measuring tap $I_B^{INPUT}$ and voltage measuring connection $V_B^{INPUT}$, is shown connected to the input side of switching unit 135-B for measuring the current and voltage of phase B at the input to switching unit 135-B. As further depicted in FIG. 7D, voltage measuring connection $V_B^{OUTPUT}$ is shown connected to the output side of switching unit 135-B for measuring the voltage of phase B at the output to switching unit 135-B.

As additionally shown in FIG. 7D, current measuring tap $I_C^{INPUT}$ and voltage measuring connection $V_C^{INPUT}$, is shown connected to the input side of switching unit 135-C for measuring the current and voltage of phase C at the input to switching unit 135-C. As further depicted in FIG. 7D, voltage measuring connection $V_C^{OUTPUT}$ is shown connected to the output side of switching unit 135-C for measuring the voltage of phase C at the output to switching unit 135-C.

Figure 8:
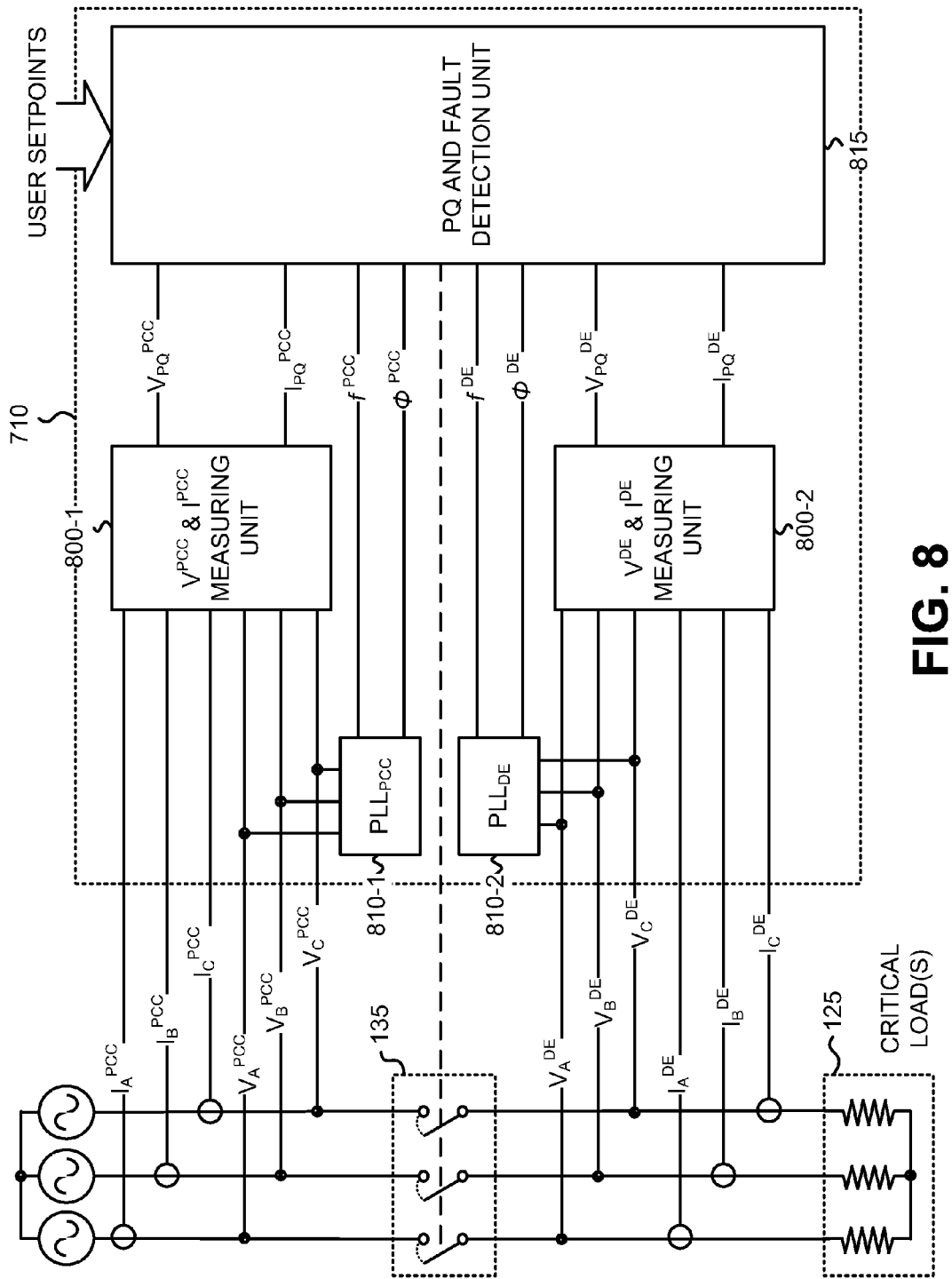
FIG. 8 depicts exemplary components of the control unit of the switching assembly of FIGS. 7A, 7B, 7C and 7D.

FIG. 8 depicts exemplary components of control unit 710 of switching assembly 130. Control unit 710 may include voltage (V) and current (I) measuring units 800-1 and 800-2, phase locked loops (PLLs) 810-1 and 810-2 and a power quality (PQ) and fault detection unit 815. Measuring unit 800-1 may measure the root-mean-square (RMS) of the three phase currents, and the three phase voltages, at the point of common coupling (PCC) between utility power source 110, non-critical load(s) 120 and switching assembly 130. As shown in FIG. 8, measuring unit 800-1 includes three current taps to measure the RMS of $I_A^{PCC}$, $I_B^{PCC}$ and $I_C^{PCC}$. Measuring unit 800-1 further includes three connections for measuring the RMS of $V_A^{PCC}$, $V_B^{PCC}$, and $V_C^{PCC}$. Measuring unit 800-1 may, using the RMS measurements of $V_A^{PCC}$, $V_B^{PCC}$, and $V_C^{PCC}$, generate an indication of PCC voltage power quality ($V_{PQ}^{PCC}$) for supplying to PQ and fault detection unit 815. Measuring unit 800-1 may, using the RMS measurements of $I_A^{PCC}$, $I_B^{PCC}$ and $I_C^{PCC}$, generate an indication of current power quality ($I_{PQ}^{PCC}$) for supplying to PQ and fault detection unit 815. Measuring unit 800-1 may additionally include current taps (not shown) for measuring the RMS of the three phase currents $I_A^{INPUT}$, $I_B^{INPUT}$, and $I_C^{INPUT}$, and connections for measuring the RMS of the three phase voltages $V_A^{INPUT}$, $V_B^{INPUT}$ and VCINPUT present at the inputs to switching units 135-A through 135-C. Measuring unit 800-2 may additionally include connections for measuring the RMS of the three phase voltages $V_A^{OUTPUT}$, $V_B^{OUTPUT}$ and $V_C^{OUTPUT}$ present at the outputs to switching units 135-A through 135-C.

Measuring unit 800-2 may measure three phase currents, and three phase voltages, at DE power source 105 (not shown in FIG. 8). As shown in FIG. 8, measuring unit 800-1 includes three current taps to measure the RMS of $I_A^{DE}$, $I_B^{DE}$, and $I_C^{DE}$. Measuring unit 800-2 further includes three connections for measuring the RMS of $V_A^{DE}$, $V_B^{DE}$, and $V_C^{DE}$. Measuring unit 800-1 may, using the RMS measurements of $V_A^{DE}$, $V_B^{DE}$, and $V_C^{DE}$, generate an indication of voltage power quality ($V_{PQ}^{DE}$) of DE power source 105 for supplying to PQ and fault detection unit 815. Measuring unit 800-1 may, using the RMS measurements of $I_A^{DE}$, $I_B^{DE}$ and $I_C^{DE}$, generate an indication of current power quality ($I_{PQ}^{DE}$) for supplying to PQ and fault detection unit 815.

PLL 810-1 may include three connections for detecting voltages $V_A^{PCC}$, $V_B^{PCC}$, and $V_C^{PCC}$. PLL 810-1 may generate an indication of frequency ($f_{PCC}$) and phase ($\Phi_{PCC}$) based on the detected voltages $V_A^{PCC}$, $V_B^{PCC}$, and $V_C^{PCC}$ of utility power source 110. PLL 810-2 may include three connections for detecting voltages $V_A^{DE}$, $V_B^{DE}$, and $V_C^{DE}$. PLL 810-2 may generate an indication of frequency ($f_{DE}$) and phase ($\Phi_{DE}$) based on the detected voltages $V_A^{DE}$, $V_B^{DE}$, and $V_C^{DE}$ of DE power source 105. PLL 810-1 and 810-2 may include phase-locked loop circuitry for generating output signals (e.g., frequency (f) and phase ($\Phi$)) related to the frequency and phase of the input voltage signals (e.g., $V_A$, $V_B$, and $V_C$).

PQ and fault detection unit 815 may receive user set point values, indications of voltage power quality ($V_{PQ}^{PCC}$ and $V_{PQ}^{DE}$) and current power quality ($I_{PQ}^{PCC}$ and $I_{PQ}^{DE}$) from measuring units 800-1 and 800-2, and indications of frequency ($f_{PCC}$ and $f_{DE}$) and phase ($\Phi_{PCC}$ and $\Phi_{DE}$) from PLLs 810-1 and 810-2. PQ and fault detection unit 815 may control the opening and closing of input switch 210, output switch 220 and bypass switch 235, and the turning on and turning off of SCR1 240-1 and SCR2 240-2 of SCR bridge 215 of each switching unit 135, based on the received user set point values (e.g., threshold or limit values), and based on the indications of voltage power quality, current power quality, frequency and phase received from measuring units 800-1 and 800-2 and PLLs 810-1 and 810-2. PQ and fault detection unit 815 may disconnect DE power source 105 from utility power source 110 based on, for example, the detection of various events, including under/over voltage or under/over frequency of utility power source 110, zero and/or negative sequence fault currents, phase instantaneous over-currents, and phase time over-currents.

Figure 9A:
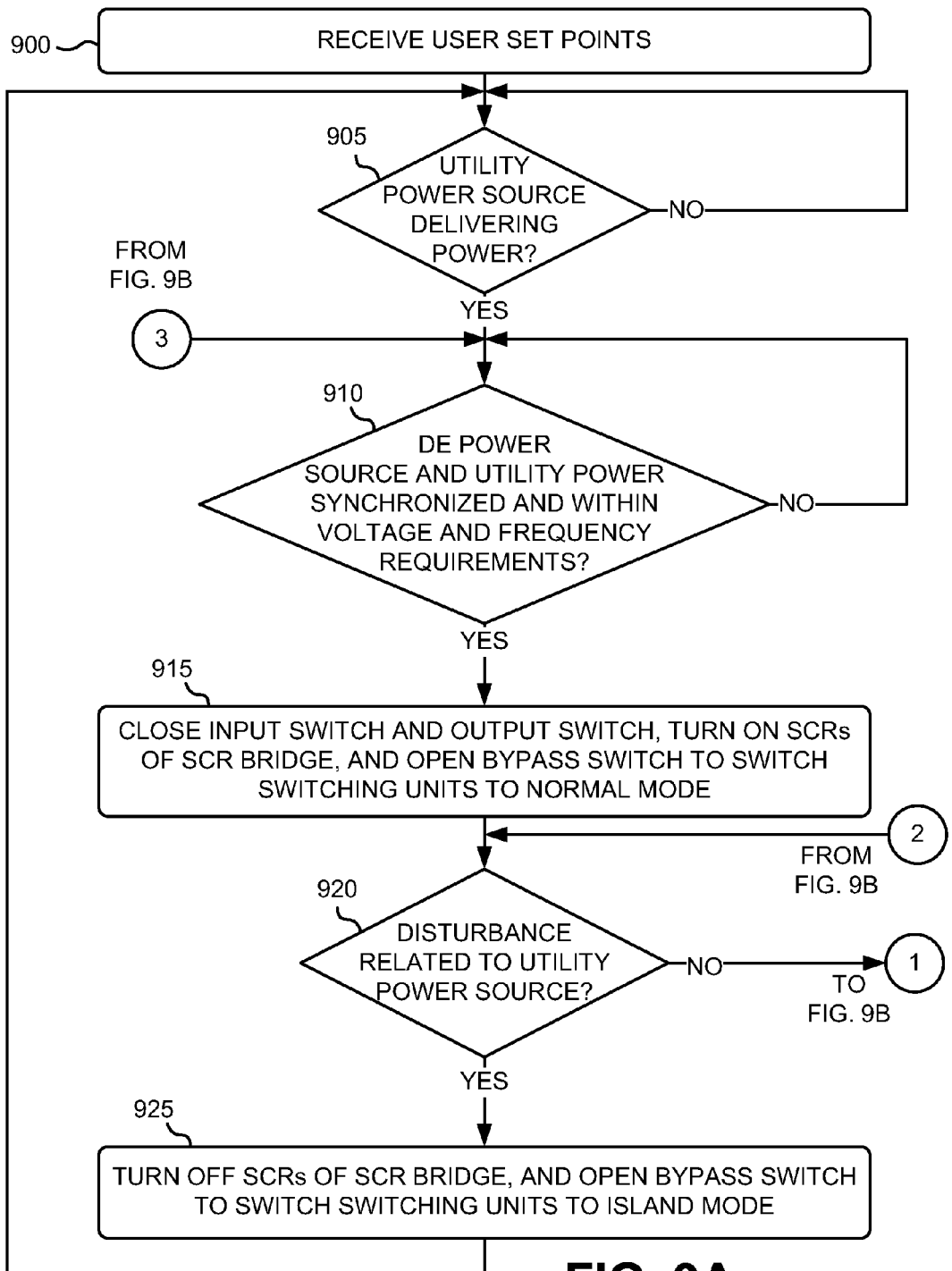
FIGS. 9A and 9B are flow diagrams that illustrate an exemplary process for controlling the switching units of the switching assembly based on utility power source and distributed energy power source disturbance events.
Figure 9B:
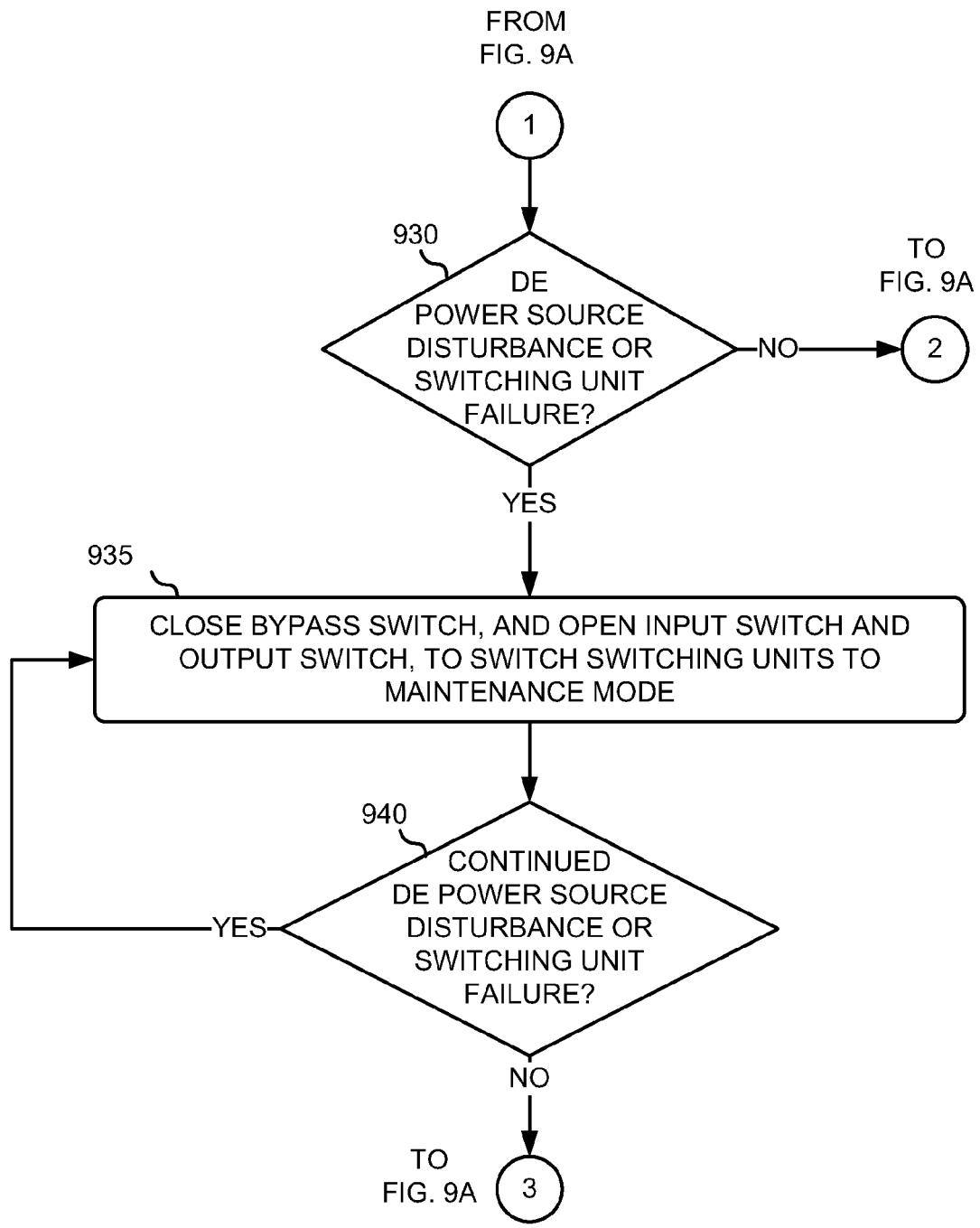

FIGS. 9A and 9B are flow diagrams that illustrate an exemplary process for controlling switching units 135 of switching assembly 130 based on utility power source and DE power source disturbance events. The exemplary process of FIGS. 9A and 9B may be implemented by control unit 710 of switching assembly 130. In the exemplary process of FIGS. 9A and 9B, input switch 210, output switch 220, and bypass switch 235 may initially be open, and SCRs 240-1 and 240-2 may initially be turned off.

The exemplary process may include receiving user set points (block 900). PQ and fault detection unit 815 of control unit 710 may receive data values associated with user-specified set points that may be used to determine when DE source 105 may be disconnected from utility power source 110, or when utility power source 110 may be switched to power critical load(s) 125 in the place of DE source 105. The user-specified set points may include, for example, under and/or over-voltage set point limits, under and/or over frequency set point limits, and power quality set point limits. Any type of parameter, or disturbance event, related to the operation of DE source 105 and/or utility power source 110 may have one or more user-specified set point(s) associated with it.

Control unit 710 may determine if utility power source 110 is delivering power to location 115 (block 905). Measuring unit 800-1 of control unit 710 may measure the PCC voltages ($V_A^{PCC}$, $V_B^{PCC}$, $V_C^{PCC}$) to identify whether sufficient voltages levels are measured. If utility power source 110 is determined to be delivering power to location 115 (YES—block 905), then control unit 710 may determine if DE power source 105 and utility power source 110 are synchronized and within voltage and frequency requirements (block 910). PQ and fault detection unit 815 of control unit 710 may determine whether the phase of DE source 105 is synchronized with the phase of utility power source 110. For example, PQ and fault detection unit 815 may compare $\Phi_{PCC}$, generated by PLL$_{PCC}$ 810-1 with $\Phi_{DE}$, generated by PLL$_{DE}$ 810-2, to determine the $\Delta\Phi$ between the phase values. PQ and fault detection unit 815 may further determine if DE power source 105 and utility power source 110 are within the voltage and frequency requirements based on $f^{PCC}$ and $f^{DE}$ and based on $V_A^{PCC}$, $V_B^{PCC}$, $V_C^{PCC}$ and $V_A^{DE}$, $V_B^{DE}$, $V_C^{DE}$. PQ and fault detection unit 815 may compare $f^{PCC}$, $f^{DE}$, $V_A^{PCC}$, $V_B^{PCC}$, $V_C^{PCC}$, $V_A^{DE}$, $V_B^{DE}$, and $V_C^{DE}$ to the user-specified set points to identify if DE power source 105 and/or utility power source 110 are within the voltage and frequency requirements.

If DE power source 105 and utility power source 110 are synchronized and within voltage and frequency requirements (YES—block 910), then control unit 710 may close input switch 210 and output switch 220, may turn on SCR1 240-1 and SCR2 240-2 of SCR bridge 215, and may open bypass switch 235 to switch switching assembly 130 to the normal mode (block 915). PQ and fault detection unit 815 of control unit 710 may send control signals to each switching unit 130 to cause the switches, and the SCRs, to enter the states (or stay in the states) shown in FIG. 2, such that DE system 100 may operate in the normal mode as shown in FIG. 1. In the normal mode, with input switch 210 and output switch 220 closed, SCR1 240-1 and SCR2 240-2 of SCR bridge 215 turned on, and bypass switch 235 open, DE power source 105 may supply power to critical load(s) 125, and to utility power source 110 via switching assembly 130. In one exemplary implementation, the SCRs associated with each of the three phases of switching assembly 130 may be turned on in sequential stages to limit the current in-rush during turn on. For example, SCR1 240-1 and SCR2 240-2 of each phase may be turned on as the voltage on that phase has a zero crossing. Therefore, control of the SCRs in switching assembly 130 may occur per phase such that the SCRs of each SCR bridge 215 turn on in sequential stages as the corresponding voltage for that phase has a zero crossing. As an example, SCR1 240-1 and SCR2 240-2 of phase A may turn on when $V_A$ incurs a zero crossing, followed by SCR1 240-1 and SCR2 240-2 of phase B turning on when $V_B$ incurs a zero crossing, followed by SCR1 240-1 and SCR2 240-2 of phase C turning on when $V_C$ incurs a zero crossing.

Control unit 710 may determine if a disturbance event has occurred that is related to utility power source 110 (block 920). The disturbance event may include, for example, an outage associated with utility power source 110, or other types of faults (e.g., negative sequence fault currents, phase instantaneous over-currents, phase time over currents, etc.) or user-specified events. If a utility power source disturbance event has occurred (YES—block 920), then control unit 710 may turn off SCR1 240-1 and SCR2 240-2 of SCR bridge 215, and may open bypass switch 235, to switch switching assembly 130 to island mode (block 925). PQ and fault detection unit 815 of control unit 710 may send control signals to switching units 130 to cause the switches, and the SCRs, to enter the states shown in FIG. 4, such that DE system 100 may operate in the island mode as shown in FIG. 3. In the island mode, with input switch 210 and output switch 220 closed, SCR1 240-1 and SCR2 240-2 of SCR bridge 215 turned off, and bypass switch 235 open, DE power source 105 may be isolated from non-critical load(s) and utility power source 110, but still may supply power to critical load(s) 125. The exemplary process may return to block 905 to determine if utility power source 105 is delivering power.

If a utility power source disturbance event has not occurred (NO—block 920), then control unit 710 may determine if a DE power source disturbance, or a switching unit failure, has occurred (block 930). The disturbance event associated with DE source 105 may include DE source 105 being turned off for maintenance purposes, or DE source 105 having an outage or other fault. The switching unit failure may include a failure of SCR1 240-1 and/or SCR2 240-2 of SCR bridge 215, or of input switch 210 or output switch 220. Thus, in the event of a component failure in SCR bridge 215, input switch 210 or output switch 220, control unit 710 may bypass these components using bypass switch 235. PQ and fault detection unit 815 of control unit 710 may analyze $\Phi_{DE}$, $f^{DE}$, $V_A^{DE}$, $V_B^{DE}$, $V_C^{DE}$, $I_A^{DE}$, $I_B^{DE}$ and $I_C^{DE}$ to identify a DE power source disturbance. If a DE power disturbance has occurred (YES—block 930), then control unit 710 may close bypass switch 235, and open input switch 210 and output switch 220, to switch switching assembly 130 to a maintenance mode (block 935). PQ and fault detection unit 815 of control unit 710 may send control signals to each switching unit 130 to cause the switches, and the SCRs, to enter the states shown in FIG. 6, such that DE system 100 may operate in the maintenance mode as shown in FIG. 5. Control unit 710 may close bypass switch 235 first, followed by opening input switch 210 and output switch 220, to prevent a power outage when switching to maintenance mode. In the maintenance mode, with input switch 210 and output switch 220 open, and bypass switch 235 closed, utility power source 110 may supply power, via switching units 135, to critical load(s) 125, in addition to supplying power to non-critical load(s) 120. If a DE power disturbance has not occurred (NO—block 930), or if a DE power disturbance has occurred but then resolved (i.e., DE source 105 turned back on, outage of DE source 105 resolved) then the exemplary process may continue by returning to block 920.

Subsequent to switching unit 135 to the maintenance mode, control unit 710 may determine if the DE power source disturbance or switching unit failure, identified in block 930, continues (block 930). If the DE power source disturbance of switching unit failure continues (YES, block 940), then the exemplary process may return to block 935, with control unit 710 maintaining bypass switch 235 closed, and input and output switches 210 and 220 open, for each switching unit 135-A through 135-C. If the DE power source disturbance or switching unit failure does not continue (NO—block 940), then the exemplary process may return to block 910 with a determination of whether DE power source 105 and utility power source 110 are synchronized and within voltage and frequency requirements.

Figure 10:
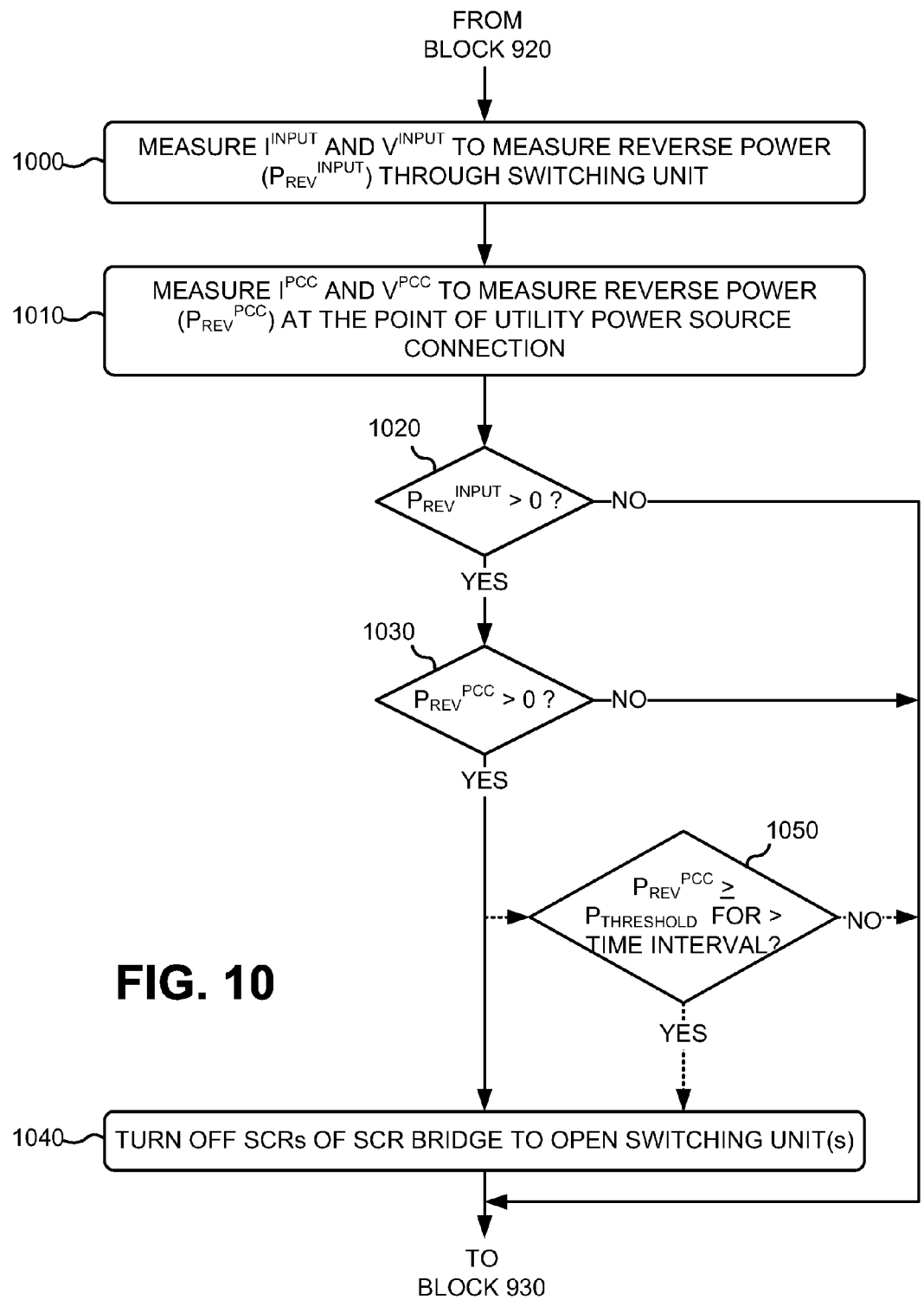
FIG. 10 is a flow diagram that illustrates an exemplary process for controlling switching units of FIG. 1 based on reverse power measured at the input of the switching units, or at a point outside of the switching units.

FIG. 10 is a flow diagram that illustrates an exemplary process for controlling switching units 135-A through 135-C based on reverse power measured at the input of switching units 135-A through 135-C, or at the PCC associated with each of switching units 135-A through 135-C. The exemplary process of FIG. 10 may be implemented by control unit 710 of switching unit 135. In one implementation, the exemplary process of FIG. 10 may represent a stand-alone process that may be implemented by control unit 710. In another implementation, the blocks of FIG. 10 may constitute a portion of the exemplary process of FIGS. 9A and 9B. In this implementation, the blocks of FIG. 10 may occur between block 920 and 930 of FIGS. 9A and 9B.

The exemplary process may include measuring the current ($I^{INPUT}$) and the voltage ($V^{INPUT}$), at the input terminal of switching unit 135, to measure reverse power ($P_{REV}^{INPUT}$) through switching unit 135 (block 1000). The reverse power ($P_{REV}^{INPUT}$) includes power directed from output terminal 230 to input terminal 200 of switching unit 135. Control unit 710 may measure the current ($I^{PCC}$) and voltage ($V^{PCC}$), at the PCC outside of switching unit 135, to measure reverse power ($P_{REV}^{PCC}$) at the point of utility power source connection (block 1010). The reverse power ($P_{REV}^{PCC}$) includes power directed from output terminal 230 of switching unit 135 towards PCC at the point of utility power source connection.

Control unit 710 may determine if reverse power exists in switching unit 135 (block 1020). If reverse power does not exist in switching unit 135 (NO—block 1020), then the exemplary process of FIG. 10 may complete (or continue to block 930 in the implementation in which the process of FIG. 10 is implemented between blocks 920 and 930 of FIGS. 9A and 9B). If the reverse power exists in switching unit 135 (i.e., $P_{REV}^{INPUT} > 0$) (YES—block 1020), then control unit 710 may determine if reverse power $P_{REV}^{PCC}$ exists at the point of utility power connection (block 1030). If reverse power does not exist at the point of utility power connection (NO—block 1030), then the exemplary process of FIG. 10 may complete (or continue to block 930 in the implementation in which the process of FIG. 10 is implemented between blocks 920 and 930 of FIGS. 9A and 9B). If reverse power does exist at the point of utility power connection (YES—block 1030), then control unit 710 may turn off SCR1 240-1 and SCR2 240-2 of SCR bridge 215 (block 1040). In an optional implementation, if reverse power does exist at the point of utility power connection, control unit 710 may determine if the reverse power $P_{REV}^{PCC}$ is greater than or equal to a threshold value for a period of time greater than a specified time interval (block 1050). The threshold value and the time interval may each be configurable. If the measured reverse power is determined to be greater than the threshold value for a period of time greater than the time interval (YES—block 1050), then control unit 710 may turn off SCR1 240-1 and SCR2 240-2 of SCR bridge 215 (block 1040).

Figure 11:
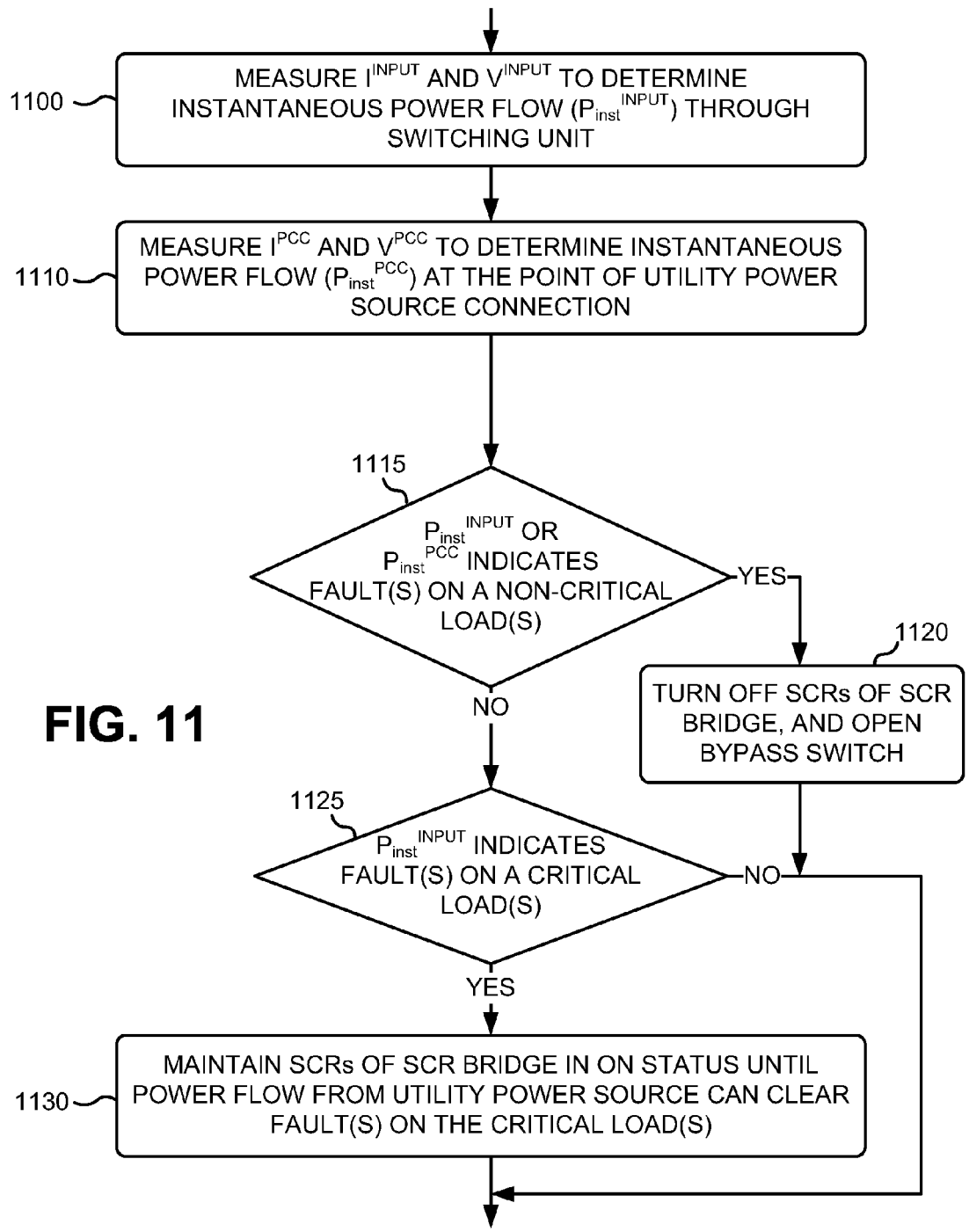
FIG. 11 is a flow diagram that illustrates an exemplary process for controlling the switching units of FIG. 1 based on the occurrence of faults at the non-critical load(s) of FIG. 1.

FIG. 11 is a flow diagram that illustrates an exemplary process for controlling switching units 135-A through 135-C based on the occurrence of faults at non-critical load(s) 120. The exemplary process of FIG. 11 may be implemented by control unit 710 of switching unit 135. In one implementation, the exemplary process of FIG. 11 may represent a stand-alone process that may be implemented by control unit 710. In another implementation, the blocks of FIG. 11 may constitute a portion of the exemplary process of FIGS. 9A and 9B. In this implementation, the blocks of FIG. 11 may occur between block 915 and 920 of FIGS. 9A and 9B.

The exemplary process may include control unit 710 measuring current ($I^{INPUT}$) and voltage ($V^{INPUT}$), at the input terminal 200 of switching unit 135, to determine the instantaneous power flow ($P_{inst}^{INPUT}$) through switching unit 135 (block 1100). Control unit 710 may measure the current ($I^{PCC}$) and voltage ($V^{PCC}$), at the PCC, to determine the instantaneous power flow ($P_{inst}^{PCC}$) at the point of utility power source connection (block 1110). Control unit 710 may determine if the instantaneous power flow through switching unit 135 ($P_{inst}^{INPUT}$) or the instantaneous power flow at the point of utility power source connection ($P_{inst}^{PCC}$) indicates the occurrence of a fault(s) on non-critical load(s) 120 (block 1115). If the instantaneous power flow through switching unit 135 indicates a fault(s) on non-critical load(s) 120 (YES—block 1115), then control unit 710 may turn off SCR1 240-1 and SCR2 240-2, and may open bypass switch 235 (block 1120). If the instantaneous power flow through switching unit 135 does not indicate a fault(s) on non-critical load(s) 120 (NO—block 1115), then control unit 710 may determine if the instantaneous power flow ($P_{inst}^{INPUT}$) at the point of utility power source connection indicates a fault(s) on critical load(s) 125 (block 1125). If the instantaneous power flow at the point of utility power source connection indicates a fault on critical load(s) 125 (YES—block 1125), then control unit 710 may maintain SCR1 240-1 and SCR2 240-2 of SCR bridge 215 in an "on" status until power flow from utility power source 110 can clear the fault(s) on critical load(s) 125 (block 1130).

Figure 12:
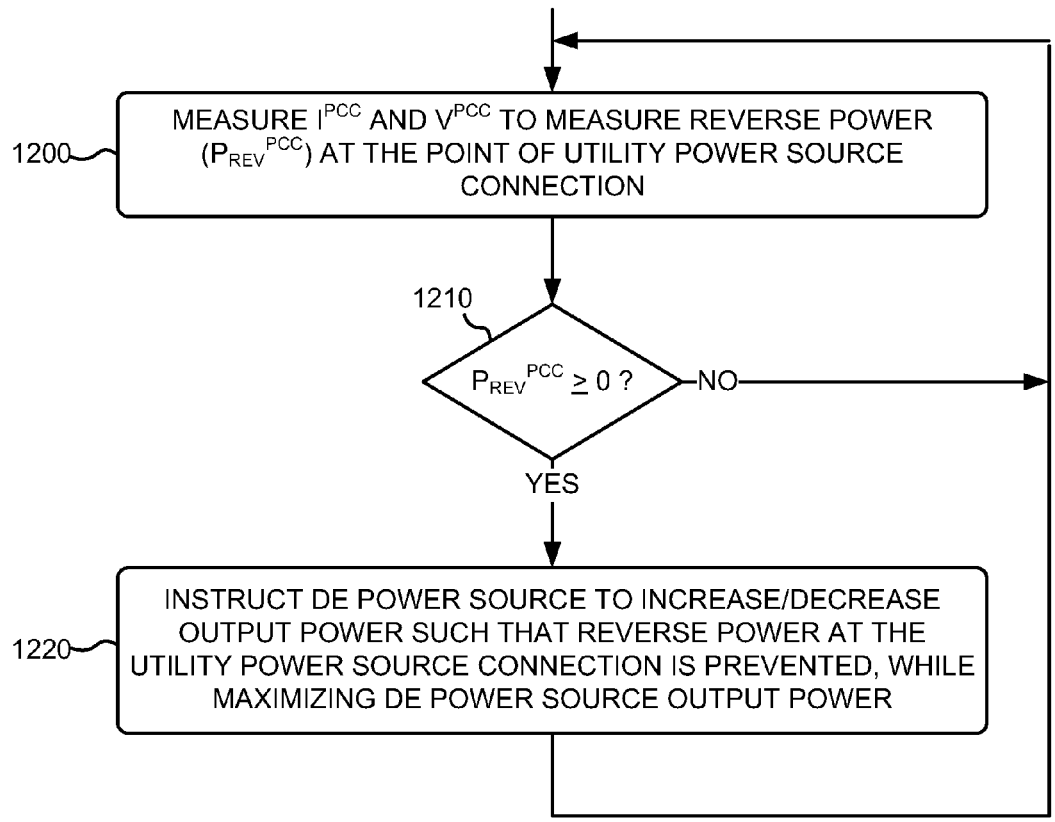
FIG. 12 is a flow diagram that illustrates an exemplary process for controlling the output power of the distributed energy source of FIG. 1 based on the flow of reverse power measured within a switching unit.

FIG. 12 is a flow diagram that illustrates an exemplary process for controlling the output power of DE power source 105 based on the flow of reverse power measured within switching unit 135. The exemplary process of FIG. 12 may be implemented by control unit 710 of switching unit 135. In one implementation, the exemplary process of FIG. 12 may represent a stand-alone process that may be implemented by control unit 710. In another implementation, the blocks of FIG. 11 may constitute a portion of the exemplary process of FIGS. 9A and 9B. In another implementation, the exemplary process of FIG. 12 may execute in parallel to the exemplary process of FIGS. 9A and 9B.

Figure 13:
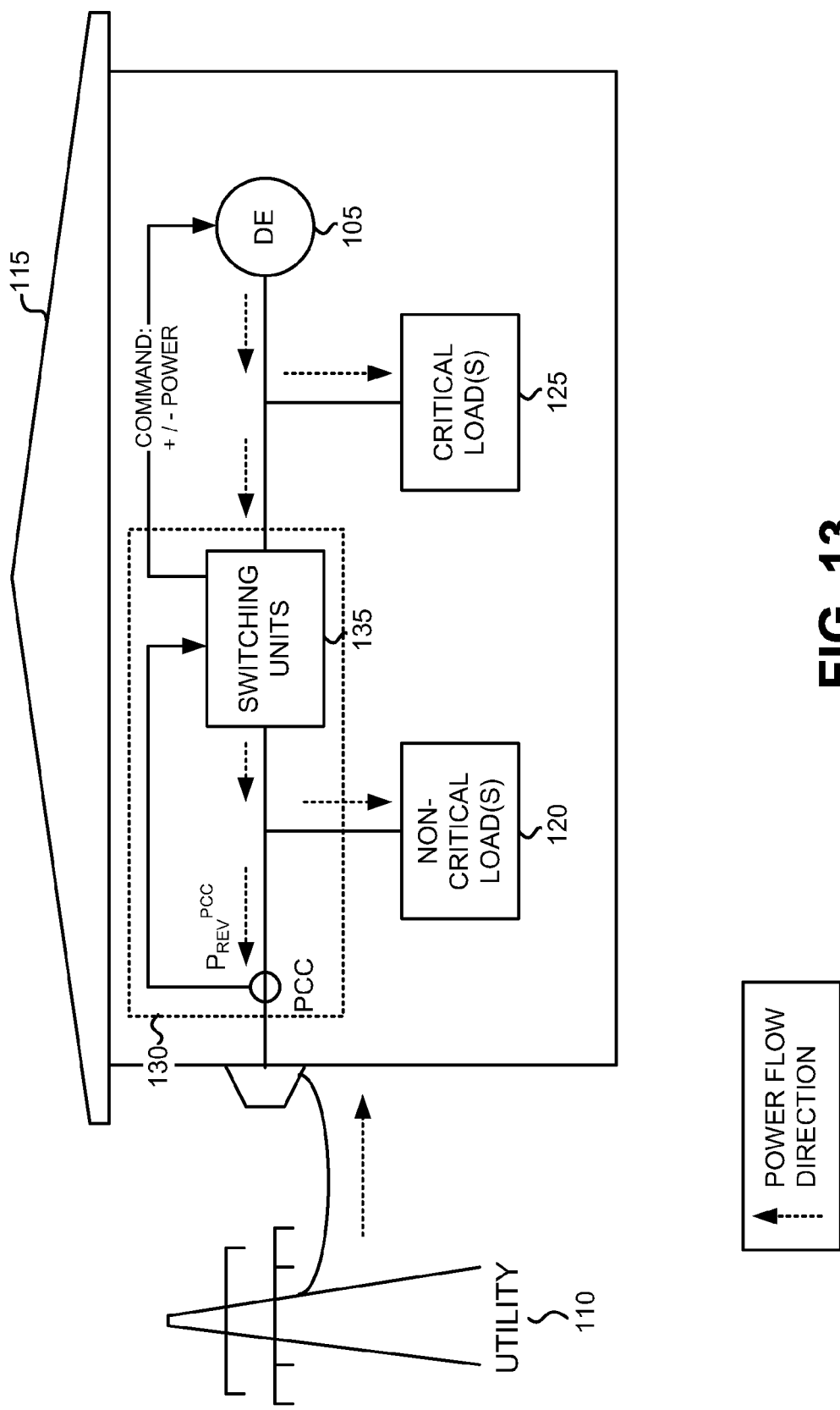
FIG. 13 depicts the implementation of the exemplary process of FIG. 12 within the distributed energy system of FIG. 1.

The exemplary process may include measuring the current ($I^{PCC}$) and the voltage ($V^{PCC}$) at the PCC to measure reverse power ($P_{REV}^{PCC}$) at the point of utility power source connection (block 1200). Control unit 710 may determine if reverse power (i.e., power flowing from output terminal 230 to input terminal 200 of switching unit 135) is measured within switching unit 135 by determining if $P_{REV}^{PCC}$ is greater than, or equal to, 0 (block 1210). If reverse power is measured within switching unit 135 (YES—block 1210), then control unit 710 may instruct DE power source 105 to increase (+) or decrease (−) its output power such that reverse power at the utility power source connection is prevented, while, at the same time, maximizing DE power source 105 output power (block 1220). FIG. 13 depicts switching units 135 sending a power increase/decrease command to DE power source 105 to increase/decrease the output power flowing from DE power source 105 towards critical load(s) 125 and switching units 135. The exemplary process may return to block 1200, with the continued measurement of reverse power at the point of utility power source connection.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 9A, 9B, 10, 11, and 12 the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A switching assembly, comprising:
   a first terminal and a second terminal, wherein the first terminal is connected to a first power source and the second terminal is connected to a second power source;
   a first switch connected to the first terminal;
   a second switch connected to the second terminal;
   a rectifier bridge connected between the first switch and the second switch, wherein the rectifier bridge comprises a first silicon controlled rectifier (SCR) connected in parallel with a second SCR;
   a third switch connected between the first terminal and the second terminal; and
   a control unit configured to:
      selectively open and close the first switch, the second switch and the third switch, and
      selectively turn on and off the rectifier bridge;
   wherein the control unit is further configured to:
      cause the first switch to close, the second switch to close, the third switch to open, and the first and second SCRs to turn on based on power being delivered into the first terminal from the first power source,
      cause the third switch to open and the first and second SCRs to turn off based on a failure of delivery of power into the first terminal from the first power source, and
      cause the third switch to close, the first switch to open, and the second switch to open based on power being delivered into the first terminal from the first power source and based on a failure of delivery of power into the second terminal from the second power source.

2. The switching assembly of claim 1, wherein a cathode of the first SCR is connected to the second switch and an anode of the first SCR is connected to the first switch, and wherein a cathode of the second SCR is connected to the first switch and an anode of the second SCR is connected to the second switch.

3. The switching assembly of claim 1, wherein the first power source comprises a public utility power source.

4. The switching assembly of claim 3, wherein the second power source comprises a distributed energy source.

5. The switching assembly of claim 1, wherein a non-critical load is coupled to the first terminal and a critical load is coupled to the second terminal.

6. The switching assembly of claim 5, wherein, when the first and second switches are closed, the third switch is open, and the first and second SCRs are turned on, power is delivered from the first power source to the non-critical load, power is delivered from the second power source to the critical load, and power is delivered from the second power source through the first switch, the second switch and the first and second SCRs to the non-critical load.

7. The switching assembly of claim 6, wherein, when the third switch is open and the first and second SCRs are turned off, power is delivered from the second power source to the critical load, and no power is delivered from the second power source through the first switch, the second switch, and the first and second SCRs to the non-critical load.

8. The switching assembly of claim 7, wherein, when the first and second switches are opened and the third switch is closed, power is delivered from the first power source to the non-critical load and through the third switch to the critical load.

9. The switching assembly of claim 1, wherein the control unit is further configured to:
   turn on the first and second SCRs when a voltage at the input terminal incurs a zero crossing.

10. A switching assembly, comprising:
a switching unit connected to a first load and a first power supply on a first side of the switching unit, and to a second load and a second power supply on a second side of the switching unit, wherein the switching unit is separate and distinct from the first load, the first power supply, the second load and the second power supply;
a control unit configured to:
cause the switching unit to close a connection between the first power supply and the second load, and to close a connection between the second power supply and the first load, when power is being delivered from the first power supply to the first side of the switching unit and when power is being delivered from the second power supply,
cause the switching unit to open the connection between the first power supply and the second load, when the first power supply fails to deliver power to the first side of the switching unit, such that power is being delivered only from the second power supply to the second load, and
cause the switching unit to close the connection between the first power supply and the second load when the second power supply stops delivering power.

11. The switching assembly of claim 10, wherein the switching unit comprises:
a silicon controlled rectifier (SCR) bridge connected in series between a first switch and a second switch; and
a third switch connected in parallel across the series connected SCR bridge, the first switch, and the second switch.

12. The switching assembly of claim 11, wherein, when causing the switching unit to close a connection between the first power supply and the second load, and to close a connection between the second power supply and the first load the control unit is configured to:
cause the first switch to close,
cause the second switch to close,
cause the third switch to open, and
cause SCRs of the SCR bridge to turn on.

13. The switching assembly of claim 11, wherein, when causing the switching unit to open the connection between the first power supply and the second load, the control unit is configured to:
cause the third switch to open, and
cause the SCRs of the SCR bridge to turn off.

14. The switching assembly of claim 11, wherein, when causing the switching unit to close the connection between the first power supply and the second load when the second power supply stops delivering power, the control unit is configured to:
cause the third switch to close,
cause the first switch to open, and
cause the second switch to open.

15. A device, comprising:
a switching unit coupled between a first power source and a second power source,
wherein the switching unit is coupled to the first power source on a first side of the switching unit and is coupled to the second power source on a second side of the switching unit,
wherein the switching unit is configured to selectively open or close a connection between the first power source and the second power source,
and wherein the switching unit is further configured to:
measure the existence of reverse power flowing from the switching unit at the first side of the switching unit towards the first power source, and
perform one of:
instruct the second power source to increase or decrease its output power such that the reverse power is prevented, while maximizing the output power of the second power source,
open the connection between the first power source and the second power source if reverse power is measured as flowing from the switching unit at the first side of the switching unit towards the first power source, or
open the connection between the first power source and the second power source if reverse power, exceeding a power threshold for greater than a specific time interval, is measured as flowing from the switching unit at the first side of the switch unit towards the first power source.

16. The device of claim 15, wherein the first power source comprises a utility power source and the second power source comprises a distributed energy power source.

17. The device of claim 16, wherein a critical load is coupled to the second side of the switching unit and wherein a non-critical load is coupled to the first side of the switching unit.

18. A switching assembly, comprising:
a first terminal and a second terminal;
a first switch connected via a direct connection to the first terminal;
a second switch connected via a direct connection to the second terminal;
a rectifier bridge connected between the first switch and the second switch, wherein the rectifier bridge comprises a first silicon controlled rectifier (SCR) connected in parallel with a second SCR;
a third switch connected via a direct connection between the first terminal and the second terminal; and
a control unit configured to:
selectively open and close the first switch, the second switch and the third switch, and
selectively turn on and off the first SCR and the second SCR.

19. The switching assembly of claim 18, wherein the first terminal is connected to a first power source and the second terminal is connected to a second power source.

20. The switching assembly of claim 19, wherein the control unit is further configured to:
cause the first switch to close, the second switch to close, the third switch to open, and the first and second SCRs to turn on based on power being delivered into the first terminal from the first power source,
cause the third switch to open and the first and second SCRs to turn off based on a failure of delivery of power into the first terminal from the first power source, and
cause the third switch to close, the first switch to open, and the second switch to open based on power being delivered into the first terminal from the first power source and based on a failure of delivery of power into the second terminal from the second power source.

* * * * *